(12) United States Patent
Overcash et al.

(10) Patent No.: US 7,934,253 B2
(45) Date of Patent: Apr. 26, 2011

(54) SYSTEM AND METHOD OF SECURING WEB APPLICATIONS ACROSS AN ENTERPRISE

(75) Inventors: Kevin Overcash, Carlsbad, CA (US); Kate Delikat, Natanya (IL); Rami Mizrahi, Rishon LeZion (IL); Galit Efron, Ramat Hasharon (IL); Doron Kolton, Pardesia (IL); Asaf Wexler, Ra'anana (IL); Netta Gavrieli, Ramat Gan (IL); Yoram Zahavi, Zichron LeZion (IL)

(73) Assignee: TrustWave Holdings, Inc., Chicago, IL (US)

( * ) Notice: Subject to any disclaimer, the term of this patent is extended or adjusted under 35 U.S.C. 154(b) by 968 days.

(21) Appl. No.: 11/532,060

(22) Filed: Sep. 14, 2006

(65) Prior Publication Data

US 2008/0034425 A1    Feb. 7, 2008

Related U.S. Application Data

(60) Provisional application No. 60/807,921, filed on Jul. 20, 2006.

(51) Int. Cl.
*G06F 11/00* (2006.01)

(52) U.S. Cl. .................. 726/22; 726/3; 726/11; 726/25

(58) Field of Classification Search ...................... 726/22
See application file for complete search history.

(56) References Cited

U.S. PATENT DOCUMENTS

| 6,351,811 | B1 | 2/2002 | Groshon et al. |
| 6,701,362 | B1* | 3/2004 | Subramonian et al. ....... 709/224 |
| 7,185,368 | B2 | 2/2007 | Copeland, III |
| 7,313,822 | B2 | 12/2007 | Ben-Itzhak |
| 2002/0013837 | A1* | 1/2002 | Battat et al. .................... 709/223 |
| 2002/0087882 | A1* | 7/2002 | Schneier et al. ............... 713/201 |
| 2003/0084323 | A1* | 5/2003 | Gales ............................. 713/200 |
| 2004/0062199 | A1* | 4/2004 | Lau et al. ....................... 370/230 |
| 2004/0143749 | A1* | 7/2004 | Tajalli et al. .................. 713/200 |

(Continued)

FOREIGN PATENT DOCUMENTS

| KR | 10-2005-0081881 A | 8/2005 |
| KR | 10-2006-0117693 A | 11/2006 |

OTHER PUBLICATIONS

BreachGate Sitegrity, "Web Site Security and Availability", Breach Security, Inc., 2005.

(Continued)

*Primary Examiner* — Kambiz Zand
*Assistant Examiner* — Yonas Bayou
(74) *Attorney, Agent, or Firm* — McKenna Long & Aldridge LLP

(57) ABSTRACT

A system and method for protection of Web based applications are described. The techniques described provide an enterprise wide approach to preventing attacks of Web based applications. Individual computer networks within the enterprise monitor network traffic to identify anomalous traffic. The anomalous traffic can be identified by comparing the traffic to a profile of acceptable user traffic when interacting with the application. The anomalous traffic, or security events, identified at the individual computer networks are communicated to a central security manager. The central security manager correlates the security events at the individual computer networks to determine if there is an enterprise wide security threat. The central security manager can then communicate instructions to the individual computer networks so as to provide an enterprise wide solution to the threat.

47 Claims, 8 Drawing Sheets

U.S. PATENT DOCUMENTS

| | | | |
|---|---|---|---|
| 2004/0199818 A1* | 10/2004 | Boilen et al. | 714/25 |
| 2005/0108578 A1* | 5/2005 | Tajalli et al. | 713/201 |
| 2005/0203881 A1* | 9/2005 | Sakamoto et al. | 707/3 |
| 2006/0015941 A1 | 1/2006 | McKenna | |
| 2006/0200572 A1* | 9/2006 | Schcolnik | 709/230 |
| 2006/0259973 A1* | 11/2006 | Sima et al. | 726/25 |
| 2006/0282897 A1* | 12/2006 | Sima et al. | 726/25 |
| 2007/0233787 A1* | 10/2007 | Pagan | 709/206 |

OTHER PUBLICATIONS

BreachView SSL, "Eliminate the SSL Blind Spot in Your IDS" Breach Security, Inc., 2005.

International Search Report/Written Opinion issued in PCT/US2007/073794 on Jun. 19, 2008.

U.S. Appl. No. 11/458,965 filed Jul. 20, 2006.

U.S. Appl. No. 11/532,058 filed Sep. 14, 2006.

U.S. Appl. No. 12/234,303 filed Sep. 19, 2008.

International Search Report/Written Opinion issued in PCT/US07/73996 on May 14, 2008.

International Search Report and Written Opinion for PCT/US2008/077106 mailed Mar. 30, 2009.

* cited by examiner

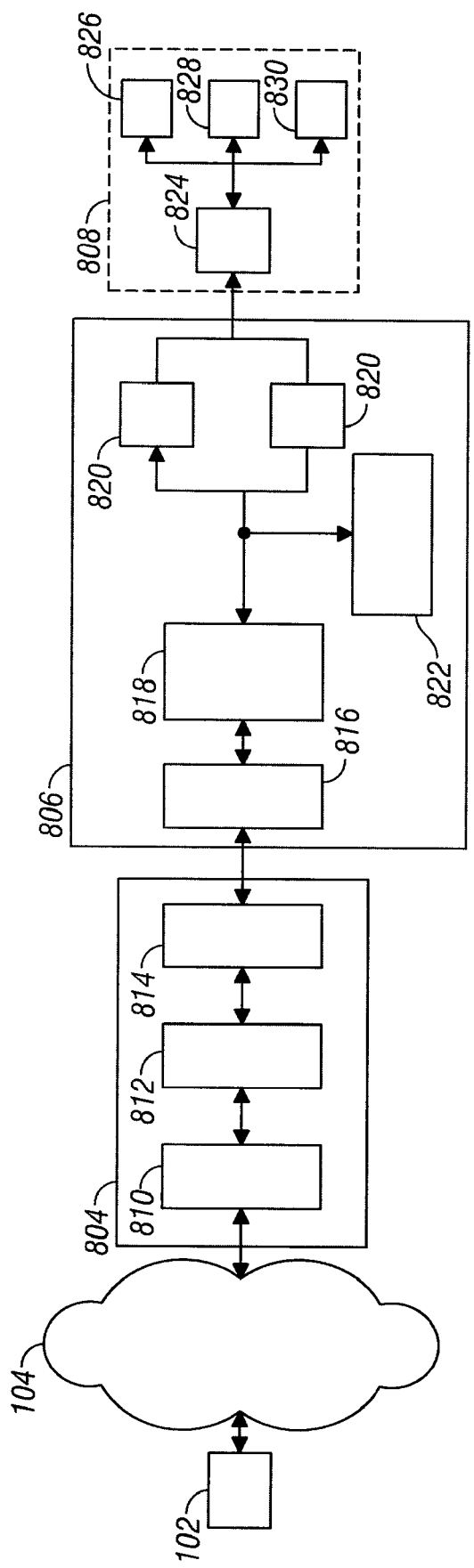
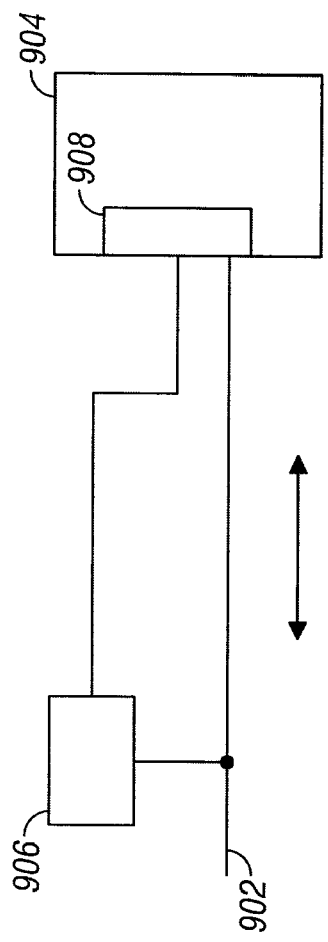
FIG. 8
FIG. 9

SYSTEM AND METHOD OF SECURING WEB APPLICATIONS ACROSS AN ENTERPRISE

RELATED APPLICATIONS

This application claims benefit of co-pending U.S. Provisional Application No. 60/807,921, filed Jul. 20, 2006, entitled "System and Method of Securing Web Applications Across an Enterprise". Benefit of priority of the filing date of Jul. 20, 2006 is hereby claimed, and the disclosure of the application is hereby incorporated by reference in its entirety.

BACKGROUND

1. Field of the Invention

This invention relates to computer network security, and more particularly preventing Web application threats.

2. Description of Related Art

Recent, well publicized, security breaches have highlighted the need for improved security techniques to protect consumer privacy and secure digital assets. Examples of organizational victims of cybercrime include well known companies that typically have traditional Web security in place, yet cyber criminals have still been able to obtain personal data from financial, healthcare, retail, and academic Web sites. Organizations that have publicly confirmed exposure of client or customer information put the figure at over 500,000 people who were victims of cybercrime in 2005, and those are the organizations that have publicly confirmed a security breach. It is highly likely that more organizations were also impacted, but did not reported it, and more troubling yet, other organizations may have had information leakage but are completely unaware of the situation.

Organizations can not afford negative brand image, credibility damage, legal consequences, or customers losses. In one example, in June 2005 MasterCard and Visa reported that a third party processor, CardSystems, had exposed credit card transaction records of approximately 40 million people that included names, card numbers and security codes. The CardSystems situation is an unfortunate example of how a single security breach can materially impact a business, yet it is also a wake up call for anyone doing business online.

The disclosure of some of these Web security breaches has led law enforcement to determine, after careful investigation, that cybercrime is being driven by organized crime. This is very different than the bright kid-next-door trying to break into a system to prove bragging rights. Targeted rings of well educated and sophisticated hackers have been uncovered, often in countries where prosecuting them is a challenge. Contributing to the increase in cybercrime is the ease with which these organized cyber criminals can target, and hack, a Web application from anywhere in the world with simple Internet access.

Properly securing Web applications and the data behind them is a critical component to doing business on the Web. Often, some of the most valuable organizational data is served through a Web browser making it more important than ever to safeguard this information from cybercriminals.

Thus, there is a need for improved systems and techniques to protect Web applications from security breaches.

SUMMARY

Techniques for preventing attacks of Web based, or network based, applications are described. The techniques described provide an enterprise wide approach to preventing attacks of Web based applications. Individual computer networks within the enterprise monitor network traffic to identify anomalous traffic. The anomalous traffic can be identified by comparing the traffic to a profile of acceptable user traffic when interacting with the application. The anomalous traffic, or security events, identified at the individual computer networks is communicated to a central security manager. The central security manager correlates the security events at the individual computer networks to determine if there is an enterprise wide security threat. The central security manager can then communicate instructions to the individual computer networks so as to provide an enterprise wide solution to the threat.

In one embodiment, the centralized security manager within the enterprise includes an input that is adapted to receive information about security events from a plurality of computer networks. The security manager includes a processor that is adapted to analyze the information about security events from the plurality of computer networks to identify security threats across the enterprise. The processor also determines an appropriate response to the threat by the plurality of computer networks. The security manager also includes an output that is adapted to communicate instructions for responding to a security threat to the plurality of computer networks. The security manager can also communicate with a centralized database that includes security policy and procedure information for the plurality of computer networks.

In another embodiment, a method of securing computer networks within an enterprise includes receiving information about security events from a plurality of computer networks within the enterprise. Then analyzing the information about security events from the plurality of computer networks to identify security threats across the enterprise, and determining an appropriate response to the threat by the plurality of computer networks. Instructions for responding to the security threat are then communicated to the plurality of computer networks.

In yet another embodiment, a computer network within an enterprise includes a security module that is adapted to monitor network traffic and to identify security events. The network also includes an output configured to communicate security events to a central security manager, and an input configured to receive instructions from the central security manager, wherein the security module responds in accordance with the instructions.

In still another embodiment, an enterprise wide computer security system includes a plurality of computer networks adapted to identify security events. The system also includes a central security manager adapted to receive information about security events from the plurality of computer networks, and to analyze the information to determine if there is a security threat to the enterprise. If it is determined that there is a security threat, then the central security manager coordinates responses by the plurality of computer networks in response to the threat.

Another embodiment of a method of securing an enterprise wide computer security system includes identifying security events within a plurality of computer networks within the enterprise. Then receiving information about the security events from the plurality of computer networks, and analyzing the information to determine if there is a security threat to the enterprise. If it is determined that there is a security threat, then coordinating responses by the plurality of computer networks to the threat.

Other features and advantages of the present invention should be apparent from the following description which illustrates, by way of example, aspects of the invention.

BRIEF DESCRIPTION OF THE DRAWINGS

FIG. 8 is a block diagram of an example computer network illustrating aspects of preventing Web application attacks.

FIG. 9 is a block diagram of another embodiment of a portion of an example computer network illustrating aspects of preventing Web application attacks.

DETAILED DESCRIPTION

Figure 1:
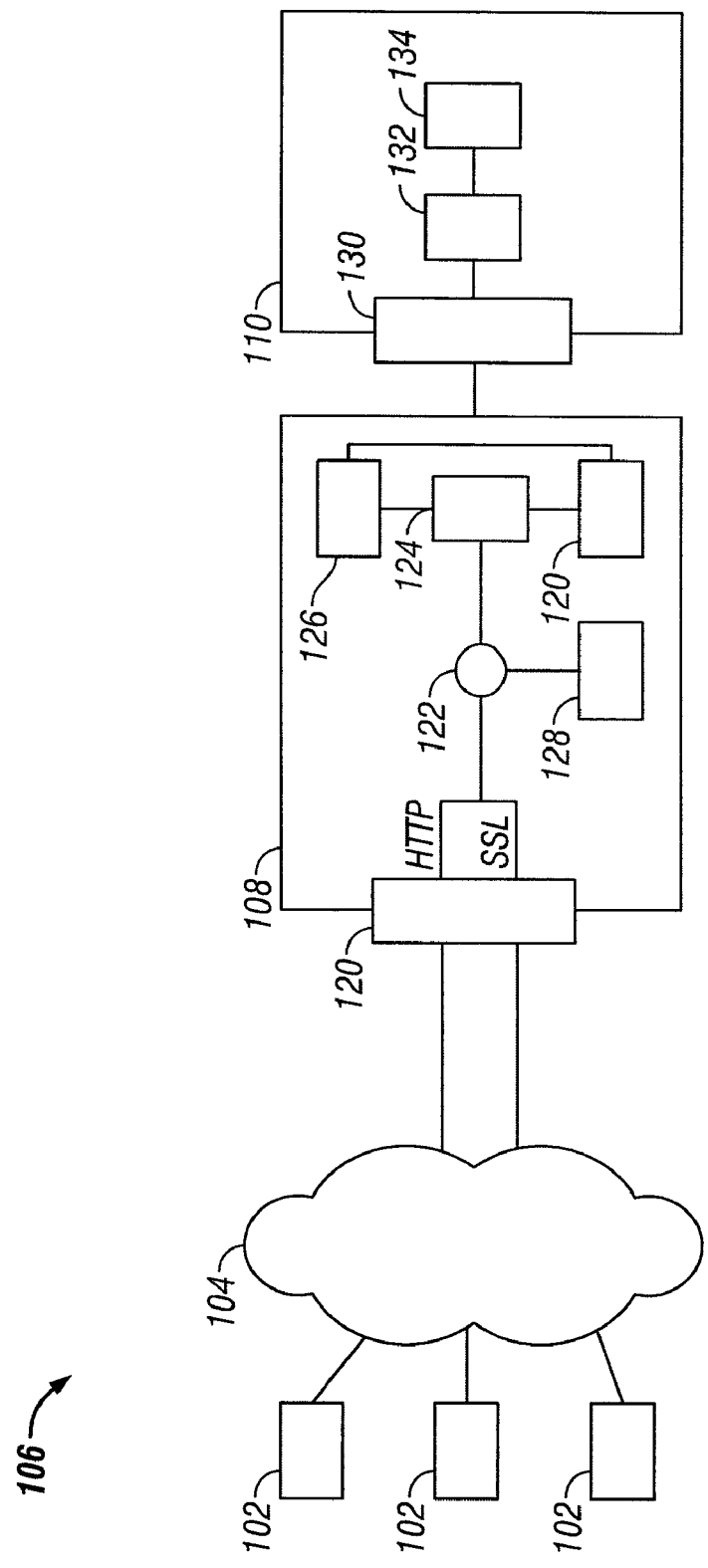
FIG. 1 is a block diagram of an example system configured in accordance with aspects of the invention.

The following detailed description is directed to certain specific embodiments of the invention. However, the invention can be embodied in a multitude of different systems and methods. In this description, reference is made to the drawings wherein like parts are designated with like numerals throughout.

Need for Increased Security

In response to increased cyber-criminal activity, government regulations for privacy and accountability mandate that there be a standard of security and customer notification if personal data is lost or stolen. In the U.S., many states have enacted a form of the Information Security Breach Act and other states have similar pending privacy legislation. As new disclosure standards emerge, consumers expect to be notified in the event of a security breach. Organizations are motivated by government regulations or consumer expectations to incorporate the necessary security measures to safeguard data. Organizations also desire to demonstrate, through security audits, that reasonable due care is taken to protect customer and financial information and that customers are notified in the event of a data theft or loss.

Some industries, such as the credit card industry, have created their own security standards to proactively address the need for managing customer data more securely and consistently. The Payment Card Industry (PCI) Data Security Standard requires Master-Card merchants to protect cardholder data, encrypt transmissions and stored data, and develop and maintain secure systems and applications. (See "Payment Card Industry Data Security Standard" at URL https://sdp.mastercardintl.com/pdf/pcd_manual.pdf (January 2005)).

Similarly, the VISA Cardholder Information Security Program (CISP) requires compliance to its standards for all entities storing, processing, or transmitting cardholder data. For example, VISA merchants must prove CISP compliance, follow outlined disclosure policies in the event of data theft of loss, and are subject to hefty financial penalties (up to $500,000 per incident) for non-compliance. (See "VISA Cardholder Information Security Program" at URL http://usa.visa.com/business/accepting_visa/ops_risk_management/cisp_merchants.html.)

Because the number of notification laws to be enacted is likely to increase, organizations are motivated to improve and validate existing security measures that protect the organization from Web threats and to demonstrate to regulators and stakeholders that security is interwoven into the business operations.

Shortcomings in Existing Security Measures

The growth in popularity and general acceptance of the Web as a network for commerce and communications has been unprecedented. However, security was not part of the original design of the Web so it is susceptible to security breaches. Further exacerbating the lack of security measures in the original design of the Web, many organizations are aggressively moving applications to the Web that were originally created for an internal network environment. The push to make applications available sometimes outweighs thorough security testing of the applications, and potentially opens the door to unanticipated vulnerabilities being uncovered once the application is available on the Internet.

Before Web applications became so popular, sensitive information was typically stored in databases and applications on internal networks. Cyber-criminals, such as hackers, wanting to obtain this information would have to gain access to the data by breaking into servers deeper and deeper within an organization's network until they found something useful. Network security solutions, such as firewalls and intrusion detection systems, were designed to meet this threat.

As applications have moved to the Web, hackers have shifted their strategy from attacking organizations by searching for vulnerable servers that can be compromised, to targeted attacks against Web applications. The use of Web applications provides a front-end to an organization's mission-critical data. Hackers no longer need to search through a network to find the data they are looking for; they can now simply browse an organization's Web site. In addition, each of the applications is different and thus, cannot typically be protected by generic measures as was possible for traditional network security solutions. Generally, each Web application requires protective measures tailored to its specific needs.

A common misconception in Web security is that using Secure Sockets Layer (SSL) will protect a Web application from attacks. While SSL supports secure transmission of sensitive information, it does not protect a Web application from attack. Attacks can be sent using SSL and the SSL transmission goes through firewalls because the firewall will usually have a port, typically port 443, open to permit SSL traffic. Using SSL provides protection for data during transmission, but it does not afford protection from attacks against the Web application, such as SQL Injection discussed further below. Many hackers have discovered that by sending attacks through SSL, they can circumvent network security because these network devices are unable to view this encrypted data.

Prior, or first-generation, application protection solutions or application firewalls followed the same paradigm as network firewalls. In these types of solutions a negative, or list-based, model of application level threats is used to screen for potential application-level attacks. However, because each application is unique, a list-based or negative security model is generally not effective at securing the Web application from attacks. An enhancement to these types of solution is to provide a tailored application security profile. However, manually creating and maintaining a profile limits the practicality of these solutions, particularly in a production environment.

In addition, first-generation application protection solutions are typically configured to be an in-line device. Being an in-line device, the solutions have to ensure that there is no, or minimal, impact to production network operations, including considerations such as traffic latency, the introduction of false positives, and the potential to block a valid transaction.

Example Aspects of a Web Application Security System

FIG. 1 is a block diagram of an example system configured in accordance with aspects of the invention. As shown in FIG. 1 users 102 are in communication with a wide area network 104. The wide area network 104 may be a private network, a public network, a wired network, a wireless network, or any combination of the above, including the Internet. Also in communication is a computer network 106. A typical computer network 106 may include two network portions, a so called demilitarized zone (DMZ) 108, and a second infrastructure network 110. The DMZ 108 is usually located between the wide area network 104 and the infrastructure network 110 to provide additional protection to information and data contained in the infrastructure network 110.

For example, the infrastructure network 110 may include confidential and private information about a corporation, and the corporation wants to ensure that the security and integrity of this information is maintained. However, the corporation may host a web site and may also desire to interface with users 102 of the wide area network 104. For example, the corporation may be engaged in e-commerce and wants to use the wide area network 104 to distribute information about products that are available to customers, and receive orders from customers. The interface to the wide area network 104, which is generally more susceptible to attacks from cyber-criminals is through the DMZ 108, while sensitive data, such as customer credit card information and the like, are maintained in the infrastructure network 110 which is buffered from the wide area network 104 by the DMZ 108.

Examples of components in a DMZ 108 include a firewall 120 that interfaces the DMZ 108 to the wide area network 104. Data transmitted and received from the wide area network 104 pass through the firewall 120, through a mirror port 122 to a load balancer 124 that controls the flow of traffic to Wed servers 126. Also connected to the mirror port 122 is a Web application protection module 128. As described further below, the Web application protection module 128 monitors traffic entering and leaving the DMZ to detect if the Web site is being attacked.

Traffic flows between the DMZ 108 and the infrastructure network 110 through a second firewall 130 that provides additional security to the infrastructure network 110. Components in the infrastructure network 110 can include an application server 132 and a database server 134. Data and information on the application server 132 and database server 134 are provided additional protection from attacks because of the operation of the DMZ.

Types of Cyber-Crimes

As noted, Web applications are susceptible to attacks from cyber-criminal. Generally, attacks against Web applications are attempts to extract some form of sensitive information from the application, or to gain some control over the application and the actions it performs. Hackers target specific organizations and spend time mapping out the Web application and performing attack reconnaissance to determine what types of attacks may be most successful against a specific application.

One way that cyber-criminals exploit web applications is a technique referred to as "targeted application attacks." Because sensitive data is often stored in an application database, the cyber-criminals will target their attacks at these databases. Unlike network-level attacks that are successful because network components are identical wherever they are installed, each Web application is unique and hence requires that it be studied to uncover potential weaknesses.

Another technique used by cyber-criminals is "parameter tampering/invalidated input." To prevent these types of attacks, parameters received by an application should be validated against a positive specification that defines elements of a valid input parameter. For example, elements such as the data type, character set, the minimum and maximum parameter length, enumeration, etc., can be validated. Without some type of control on each parameter an application is potentially open to exploit over the Web.

Still another technique used by cyber-criminals is "SQL Injection." The term SQL Injection is used to refer to attacks that take advantage of a Web application using user input in database queries. In this technique, the cyber-criminal will pose as a valid user and enter input in the Web application's form in an attempt to manipulate the Web application into delivering information that is not normally intended to be delivered to the cyber-criminal. In this technique, an attacker will usually first map out a Web application site to get an understanding of how it is organized, and identify areas that take input from a user. Many common security defects in Web applications occur because there is no validation of a user's input. If there is no input validation and an application uses a database to store sensitive information, then an attacker, or cyber-criminal, can attempt to identify areas within the application that takes a user input to generate a database query, such as looking up a specific user's account information. Attackers can then craft a special data or command string to send to the application in the hope that it will be interpreted as a command to the database instead of a search value. Manipulating the special data or command string sent to the application is referred to as an "Injection" attack or "SQL Injection." An example of an SQL Injection is sending a string command that has been manipulated to request a list all credit card numbers in the database.

Yet another technique used by cyber-criminals is "Cross Site Scripting" (XSS). Using XSS, cyber-criminals take advantage of Web servers that are designed to deliver dynamic content that allows the server to tune its response based on users' input. Dynamic content has become integral to creating user-friendly sites that deliver content tailored to clients' interests. Examples of such sites include eCommerce sites that allow users to write product reviews. These sites allow users to provide content that will be delivered to other users. Using XSS, a cyber-criminal attempts to manipulate a Web application into displaying malicious user-supplied data that alters the Web page for other users without their knowledge.

Typically cross site scripting vulnerabilities occur when Web applications omit input validation before returning client-supplied information to the browser. For example, a Web application may fail to discover that HTML or JavaScript code is embedded in the client input and inadvertently return malicious content to the cyber-criminal posing as a user. Because the code appears to come from a trusted site, the browser client treats it as valid and executes any embedded scripts or renders any altered content. Examples of the result of a successful XSS attack can include exposing end user files, installing Trojans, redirecting the user to another Web site or page, and modifying content presented to the user.

Victims of an XSS attack may be unaware that they have been directed to another site, are viewing altered content, or worse. Using XSS provides cyber-criminals an extremely effective technique for redirecting users to a fake site to capture login credentials, similar to phishing. To effectively secure Web applications and protect users from XSS attacks, user input from dynamically generated content needs to be validated and otherwise handled correctly.

Using a technique referred to as "Forceful Browsing" attackers determine if an application uses any scripts or middleware components with known vulnerabilities. Typically, the attacker will type requests for these known vulnerable application components into the URL and determine from the server response whether the vulnerable piece of software is used. The known vulnerabilities are often buffer overflows which provide the attacker with the ability to gain administrative access on the server, at which point they can manipulate the application and its data.

In a another technique referred to as "Improper Error Handling" while mapping out an application and performing attack reconnaissance, attackers will monitor error messages returned by the application. These messages result from errors in the application or one of its components and provide a wealth of information to attackers. Error messages from scripts and components can detail what components and versions are used in the application. Database error messages can provide specific table and field names, greatly facilitating SQL injections. Server error messages and stack traces can help set up buffer overflows, which attackers use to gain administrative access to servers.

In still another technique referred to as "Session Hijacking" attackers focus on session mechanisms to identify any weaknesses in how sessions are implemented. Attackers can manipulate these mechanisms to impersonate legitimate users and access their sensitive account information and functionality.

Security Model to Protect Web Applications

Typically, network-level devices use a negative security model or "allow all unless an attack is identified." Network-level devices such as Intrusion Detection and Prevention Systems are effective with this generic negative model because network installations are common across organizations. However, every Web application is different and a generic or "one-size-fits-all" model for security generally will not work satisfactorily.

A positive, behavior-based security model is generally more effective in securing Web applications. Because each Web application is unique, they expose their own individual sets of vulnerabilities that need to be addressed. A positive behavior-based security model provides protection against threats that are outside the bounds of appropriate, or expected, behavior. Because the security model monitors behavior to determine if it is appropriate, the model can provide protection against unforeseen threats.

To implement a positive, behavior-based security model, a tailored application security profile is created that defines appropriate application behavior. While a unique security profile is needed for every Web application, manual creation of these profiles may be overly burdensome. Instead, it would be beneficial to create security profiles automatically for each application. In addition, it would be beneficial to automate profile maintenance which ensures that application changes are incorporated into the profile on an on-going basis.

As noted, Web applications expose a new set of vulnerabilities that can only be properly understood within the context of the particular application. For example, SQL injection attacks are only valid in applications that take user input. Likewise, forceful browsing attempts can only be determined by understanding the interplay of all the scripts and components that make up the Web application. Further, session manipulation techniques can only be identified by understanding the session mechanism implemented by the application.

To effectively protect a Web application requires understanding how the application works. Thus, generic protection mechanisms, such as those provided by network security devices, are typically inadequate due to a high rate of false positives or attacks missed entirely due to a lack of understanding of where exploitable vulnerabilities are exposed within a specific application.

Exemplary Embodiments of Web Application Security

In one embodiment of the Web application security system, protection techniques are adapted to address the unique security challenges inherent in Web applications. The techniques fill holes in network-level security, provides tailored application-specific security, and comprehensive protection against an array of potential Web-based threats.

The techniques include combining a behavioral protection model with a set of collaborative detection modules that includes multiple threat detection engines to provide security analysis within the specific context of the Web application. In addition, the techniques reduce the manual overhead encountered in configuring a behavioral model, based upon a profile of typical or appropriate interaction with the application by a user, by automating the process of creating and updating this profile. Further, the techniques include a robust management console for ease of setup and management of Web application security. The management console allows security professionals to setup an application profile, analyze events, and tune protective measures. In addition, the management console can provide security reports for management, security professionals and application developers.

The techniques described further below, allow organizations to implement strong application-level security using the same model that is currently used to deploy the applications themselves. The techniques include additional advantages over other technologies by not requiring an inline network deployment. For example, the techniques have minimal impact on network operations because they can be deployed off of a span port or network tap and does not introduce another point of failure or latency to network traffic.

While the techniques described are not implemented inline, they can prevent attacks against Web applications by interoperating with existing network infrastructure devices, such as firewalls, load balancers, security information management (SIM) and security event management (SEM) tools. Because Web application attacks are typically targeted, and may require reconnaissance, the techniques are adapted to block attacks from a hacker, or cyber-criminal, before they are able to gather enough information to launch a successful targeted attack. Various techniques may be combined, or associated, to be able to identify and correlate events that show an attacker is researching the site, thereby giving organizations the power to see and block sophisticated targeted attacks on the application.

Some of the advantages provided by the techniques described include protecting privileged information, data, trade secrets, and other intellectual property. The techniques fill gaps in network security that were not designed to prevent targeted application level attacks. In addition, the techniques dynamically generate, and automatically maintain, application profiles tailored to each Web application. The techniques can also provide passive SSL decryption from threat analysis without terminating an SSL session.

The techniques can also provide flexible distributed protection based upon a distributed detect/prevention architecture (DDPA). Additional protection of customer data is provided by exit control techniques that detect information leakage. A graphical user interface (GUI) can provide detailed event analysis results as well as provide detailed and summary level reports that may be used for compliance and audit reports. Use of various combinations of these techniques can provide comprehensive protection against known, as well as unknown, Web threats.

Figure 2:
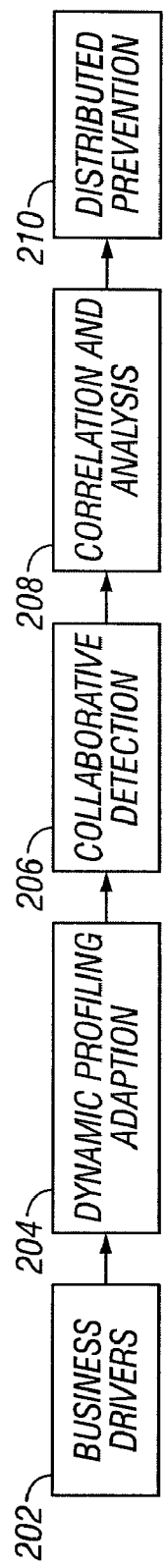
FIG. 2 is a block diagram illustrating aspects of an example embodiment of a Web application protection system which can be carried out by the Web application protection module of FIG. 1.

FIG. 2 is a block diagram illustrating aspects of an example embodiment of a Web application protection system which can be carried out by the Web application protection module 128 in FIG. 1. As shown in FIG. 2, a business driver module 202, provides input about the types of threats that are anticipated, and that protection against is sought, or the types of audits or regulations that an entity wants to comply with. Examples of threats include identity theft, information leakage, corporate embarrassment, and others. Regulatory compliance can include SOX, HIPAA, Basel LL, GLBA, and industry standards can include PCI/CISP, OWASP, and others. The business driver module 202 provides input to a dynamic profiling module 204.

The dynamic profiling module 204 develops profiles of Web applications. The profiles can take into account the business drivers. The profiles can also be adapted as Web applications are used and user's behavior is monitored so that abnormal behavior may be identified. The profiles can also be adapted to identify what types of user input is considered appropriate, or acceptable. The dynamic profiling module provides input to a collaborative detection module 206.

The collaborative detection module 206 uses the input from the dynamic profiling module 204 to detect attacks against a Web application. The collaborative detection module can monitor, and model, a user's behavior to identify abnormal behavior of a user accessing a Web application. The collaborative detection module 206 can also monitor user activity to identify signatures of attack patterns for known vulnerabilities in a Web application. Other aspects include protection against protocol violations, session manipulation, usage analysis to determine if a site is being examined by a potential attacker, monitoring out bound traffic, or exit control, as well as other types of attack such as XML virus, parameter tampering, data theft, and denial of services attacks. The collaborative detection module 206 provides the results of its detection to a correlation and analysis module 208.

The correlation and analysis module 208 receives the detection results from the collaborative detection module 206 and performs event analysis. The correlation and analysis module 208 analyses events reported by the collaborative detection module 206 to determine if an attack is taking place. The correlation and analysis module 208 can also correlate incoming requests from users with outgoing response to detect if there is application defacement or malicious content modification being performed. The correlation and analysis module may establish a severity level of an attack based upon a combined severity of individual detections. For example, if there is some abnormal behavior and some protocol violations, each of which by itself may set a low severity level, the combination may raise the severity level indicating that there is an increased possibility of an attack. The output of the correlation and analysis module 208 is provided to a distributed prevention module 210.

The distributed prevention module 210 provides a sliding scale of responsive actions depending on the type and severity of attack. Examples of responses by the distribution prevention module 210 include monitor only, TCP-resets, load-balancer, session-blocking, firewall IP blocking, logging users out, and full blocking with a web server agent. The distribution prevention module 210 can also include alert mechanisms that provide event information to network and security management systems through SNMP and syslog, as well an email and console alerts.

Using the dynamic profiling module 204, collaborative detection module 206, correlation and analysis module 208, and distributed prevention module 210 security for a Web application can be provided. Improved Web application security provides protection of privileged information, increased customer trust and confidence, audit compliance, increased business integrity, and brand production.

Figure 3:
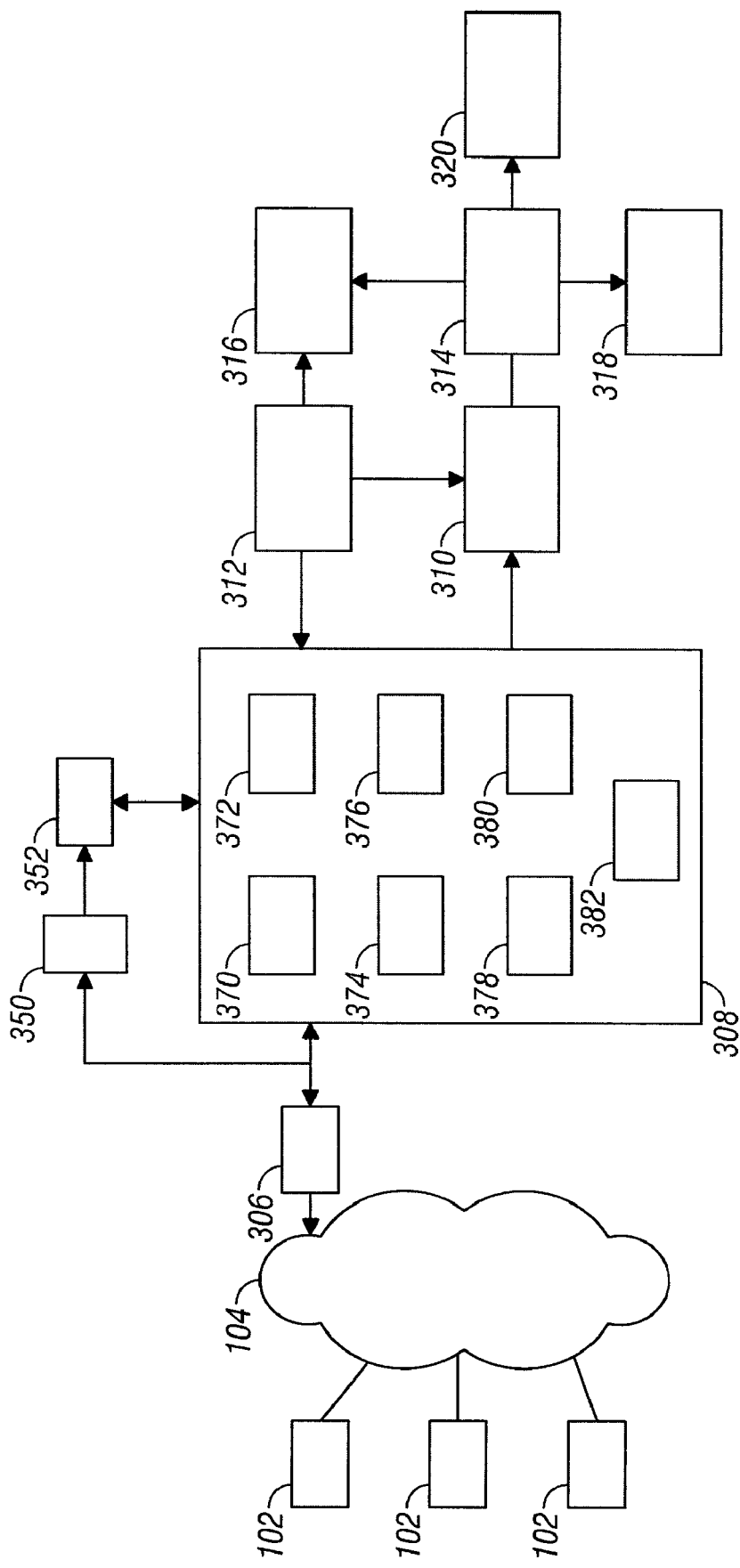
FIG. 3 is a block diagram of illustrating further detail of an example dataflow in a Web application security technique as may be performed by the Web application protection module of FIG. 1.

FIG. 3 is a block diagram of illustrating further detail of an example dataflow in a Web application security technique as may be performed by the Web application protection module 128 of FIG. 1. As illustrated in FIG. 3 multiple users 102 are in communication with a wide area network 104, such as the Internet. The users may desire to access a Web application. Typically, a user will access a Web application with web traffic using SSL encryption. A SSL decryption module 306 can passively decrypt the traffic to allow visibility into any embedded threats in the web traffic. The web traffic then flows to a collaborative detection module 308 where the traffic is analyzed in the context of appropriate application behavior compared to the applications' security profile. If an anomaly is discovered, it is passed to one or more of the multiple threat-detection engines included within the collaborative detection module 308. The results from the collaborative detection module 308 are communicated to an Advanced Correlation Engine (ACE) 310 where it is determined the threat context and to reduce false positives. In addition, the collaborative detection module 308 monitors outbound traffic as well as inbound traffic to prevent data leakage such as Identity Theft.

Advanced Correlation Engine

In one embodiment, the ACE 310 includes a first input adapted to receive threat-detection results and to correlate the results to determine if there is a threat pattern. The ACE 310 also includes a second input adapted to receive security policies and to determine an appropriate response if there is a threat pattern. The ACE also includes an output adapted to provide correlation results to an event database 314. The correlation engine examines all of the reference events generated by the detection engines. This can be viewed as combining positive (behavior engine/adaption) and negative security models (signature database) with other specific aspects to web application taken into account (session, protocol). As an example consider a typical SQL Injection, at least one if not two behavioral violations will be detected (invalid characters and length range exceeded) and several signature hits may occur (SQL Injection (Single quote and equals) and SQL Injection (SELECT Statement)). Any one of these events on their own will typically be a false positive, but when correlated together, they may provide a high likelihood of an actual attack.

Another example of the correlation engine is seen when the security system is deployed in monitor only mode and an actual attack is launched against the web application. In this example, the security system will correlate the ExitControl engine events (outbound analysis) with the inbound attacks to determine that they were successful and escalate the severity of the alerting/response.

If the ACE 310 confirms a threat, then the security policy for the application, which is provided by a security policy module 312, is checked to determine the appropriate responsive action. The ACE 310 may also communicate its results to the event database 314 where the ACE results are stored. The event database 314 may also be in communication with a distributive detect prevent architecture (DDPA) module 316.

A security policy, or "Policy", defines a configuration of the security system's detection and prevention capabilities for a specific site. A policy defines the attacks and information leakage the system will look for while analyzing traffic and what response actions to take should something be detected. A policy may be specific implementation of a general security policy of the organization or enterprise as it relates to a specific web application. A policy can be defined per application, or it can be defined per site. In one embodiment, a policy contains "BreachMarks" and security events which may be presented to a user in a tree structure that contains groups and sub-groups that organize the security events for the user to view. Users will see in the BreachMarks group all available BreachMarks in the system—there is no list per site, a user simple chooses which BreachMarks to enable for this policy.

In one embodiment a Policy can specify the following configurations:
For Inbound Events (Attacks):
  Enable/Disable
  Action for Successful attack, Unsuccessful attack, attack attempt and Information leakage
For Outbound Events (Leakage):
  Enable/Disable
  Action upon detection
For BreachMarks:
  Whether the data matching this BreachMark is to be masked (i.e. obfuscated) in the logs, events sent to the console, and in reports.

In response to an event, a policy can identify actions to be taken by the security system. Examples of actions that can be taken include:
  Log—Write an event to the DB so it can be displayed in the Event Viewer
  SNMP Alert—Set an SNMP trap
  Reset—Send a TCP reset
  Block—Block the attacker at the firewall It is noted that logging an event, or any other desired action, can be the default action for an event that does not have any action identified (e.g. new event, event that was previously disable).

In one embodiment, a single Policy can be applied to a specific site. In addition, specific policy may be applied to multiple sites. If an "applied" policy is updated, it will remain "applied", and the updates will take effect in all sites. Users may create custom BreachMarks to define patterns for sensitive information within their organization. In addition a number of pre-defined policies providing configurations tuned to specific vertical markets and levels of acceptable risk can be provided to the user. A "standard policy" can be setup to serve as the default policy. In the event that a user does not "assign" a policy to an application, this default policy can be used. Also, standard policies may be updated and the updates can be distributed to the user. Further, users may create their own custom policies by modifying pre-defined policies in the Policy Manager.

Policies can be imported and exported thereby allowing users to copy policies from one system to another. Typically the security policy module 312 will be responsible for the following tasks:
  Load/Update Policy from a database
  Load/Save Policies from/into the database
  Load/Save Sites-Policies associated from/into a configuration file
  Load/Save Sites-Policies association from/into the database
  Update relevant components on configuration changes
  Perform the configured action in response to a correlated event When detecting security events, the policy module 312 receives notification on detected events. Upon receipt of a security event, the policy module 312 checks what responsive action should be taken. When there has been an event the policy module 312 enables signatures that participate in the newly enabled security events. In addition, the policy module 312 may disable signatures that participate only in recently disabled security events. To accomplish this the policy module 312 determines which signatures are participating in the newly enabled security events, it then requests the signatures to add them.

As shown in FIG. 3, the responsive action may be provided to the DDPA module 316 by the security policy module 312. The DDPA module 316 may also receive information from the ACE 310 via the event database 314. The DDPA module 316 may, for example, alert, log, or block a threat by coordinating distributed blocking with a network component, not shown, such as a firewall, Web server. or Security Information Manager (SIM).

The event database 314 may also be in communication with an event viewer 318, such as a terminal, thereby providing information about events to a network administrator. The event database 314 can also communicate input to a report generating module 320 that generates reports about the various events detected.

Adaption Module

An adaption module 350 monitors Web traffic and continually updates and tunes a security profile module 352 that maintains security profiles of applications. The updated security profiles are communicated to the collaborative detection module 308 so that a current security profile for an application is used to determine if there is a threat to the application. Following is a more in-depth description of aspects and features of the Web application security techniques.

Passive SSL-Decryption

It is estimated that up to fifty percent of network traffic is currently using SSL for secure communications. While necessary for secure data transit, SSL also enables hackers to embed attacks within the SSL and thereby avoid detection at the network perimeter. Through visibility into the SSL traffic an application may be afforded protection. It is preferred to provide passive SSL decryption without terminating the SSL session. The decrypted payload may be used for attack analysis only, clear text is not enabled for the internal LAN and non-repudiation is maintained for the SSL connection. An example of passive SSL decryption can be found in co-pending U.S. patent application Ser. No. 11/325,234, entitled "SYSTEM TO ENABLE DETECTING ATTACKS WITHIN ENCRYPTED TRAFFIC" filed Jan. 4, 2006, and assigned to the assignee of the present application incorporated herein in its entirety.

As noted, the adaption module 350 monitors Web traffic to develop and maintain a profile of an application. In one embodiment, the adaption module 350 includes an input that is adapted to monitor traffic of users as the user interacts with a Web application. The adaption module 350 also includes a profiler adapted to identify interaction between the user and the application thereby determining a profile of acceptable behavior of a user while interacting with the application. During an initialization period, the adaption module 350 develops an initial profile, then the profile is modified if additional acceptable behavior is identified. For example, as users interact with an application, or if an application is updated or modified, what is considered acceptable behavior may change. Thus, the adaption module 350 will modify the profile to reflect these changes. The adaption module 350 also includes an output that is adapted to communicate the profile to the security profile module 353. The adaption module 353 process creates application profiles by using an advanced statistical model of all aspects of the communication between the application and the user. This model may be initially defined during a learning period in which traffic is gathered into statistically significant samples and profiles are periodically generated using statistic algorithms. The model may be further enhanced over time and periodically updated when changes are detected in the application. This model can include validation rules for URLs, user input fields, queries, session tracking mechanisms, and components of the http protocol used by the application.

Management Console

Figure 4:
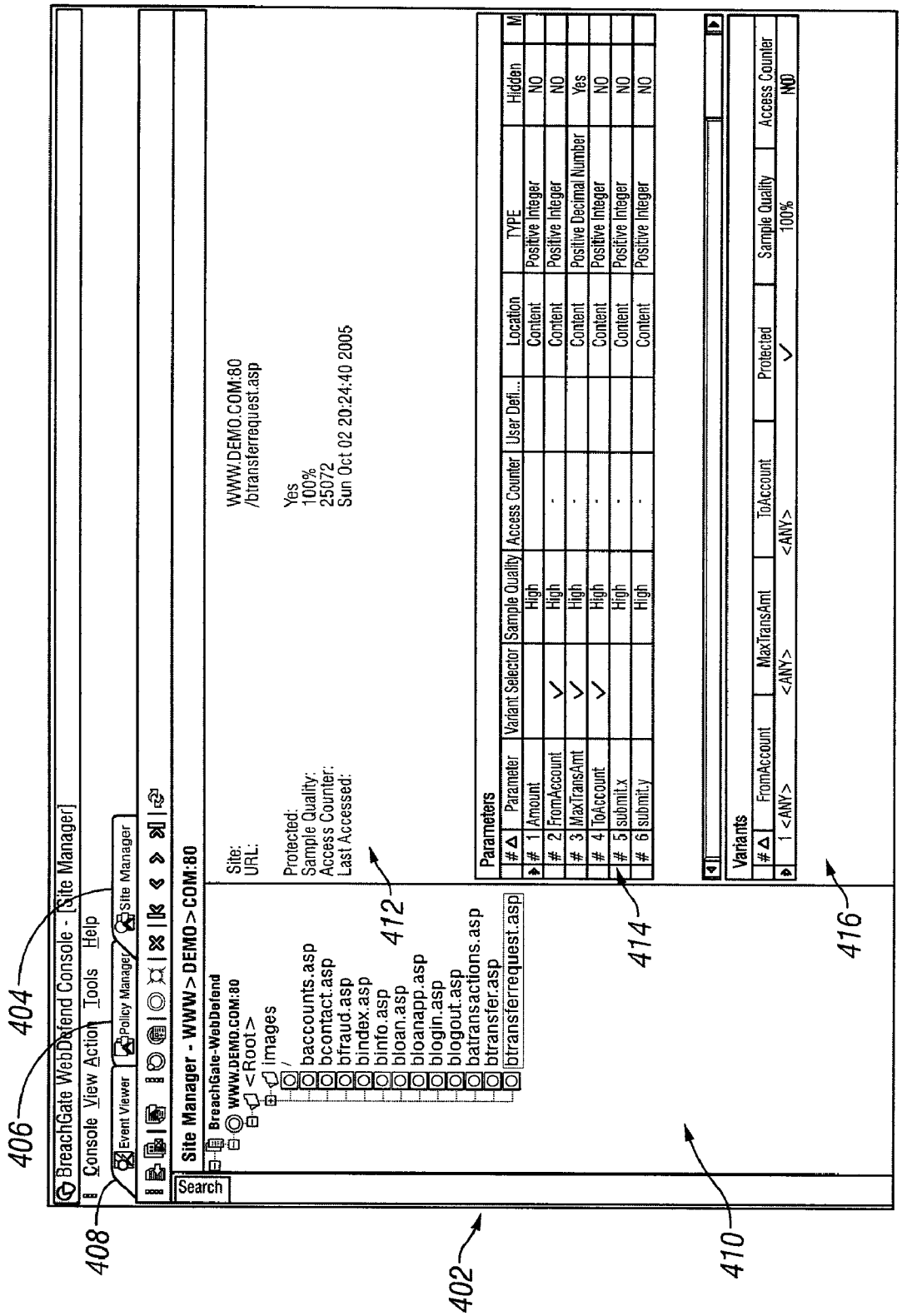
FIG. 4 is an example display, generated by the management console, designed to enable application security management.

A management console can be used to generate displays of information to a network administrator on an event viewer 318 of FIG. 3. FIG. 4 is an example display 402, generated by the management console, designed to enable intuitive application security management. As shown in FIG. 4, the display 402 generated by the management console can include tabs for a site manager 404, a policy manage 406, and an event viewer 408. In FIG. 4, the site manager tab 404 has been selected. The site manager display 404, generated by the management console, provides a user interface for interacting with an application's profile, as developed and stored in the adaption modules 350 and application profile 352 of FIG. 3. The site manager display 404 depicts an application's security profile or model in a hierarchical tree structure. Nodes on the tree represent URL's within the application profile.

The site manager display 404 can also include a directory window 410 allowing the network administrator to navigate through the application profile. The directory window 410 can be a site map organized in a hierarchy to provide an intuitive interface into the organizational structure of the web application.

The site manager display 404 also includes a status window 412 where information about the status of the Web application protection system is displayed. The Status Window 412 can display the status of the attack detection engines and performance and access statistics.

There is also a parameters window 414 where the status of various parameters of the Web application protection system is displayed. The parameter window 414 can list each user entry field or query in the selected URL. Each parameter entry includes the quality of the statistical sample size for this field, validation rules for determining the correct behavior of user entries in the field, and other characteristics.

The site manager display 404 can also include a variants window 416 where information about variants that are detected can be displayed. The variant window 416 can list the response pages possible through various valid combinations of user parameters selected in the request. For example, if a page had a list of products that a user could select, the page would have variants for each different possible product in the list. Variants include information used to uniquely identify the response page.

Figure 5:
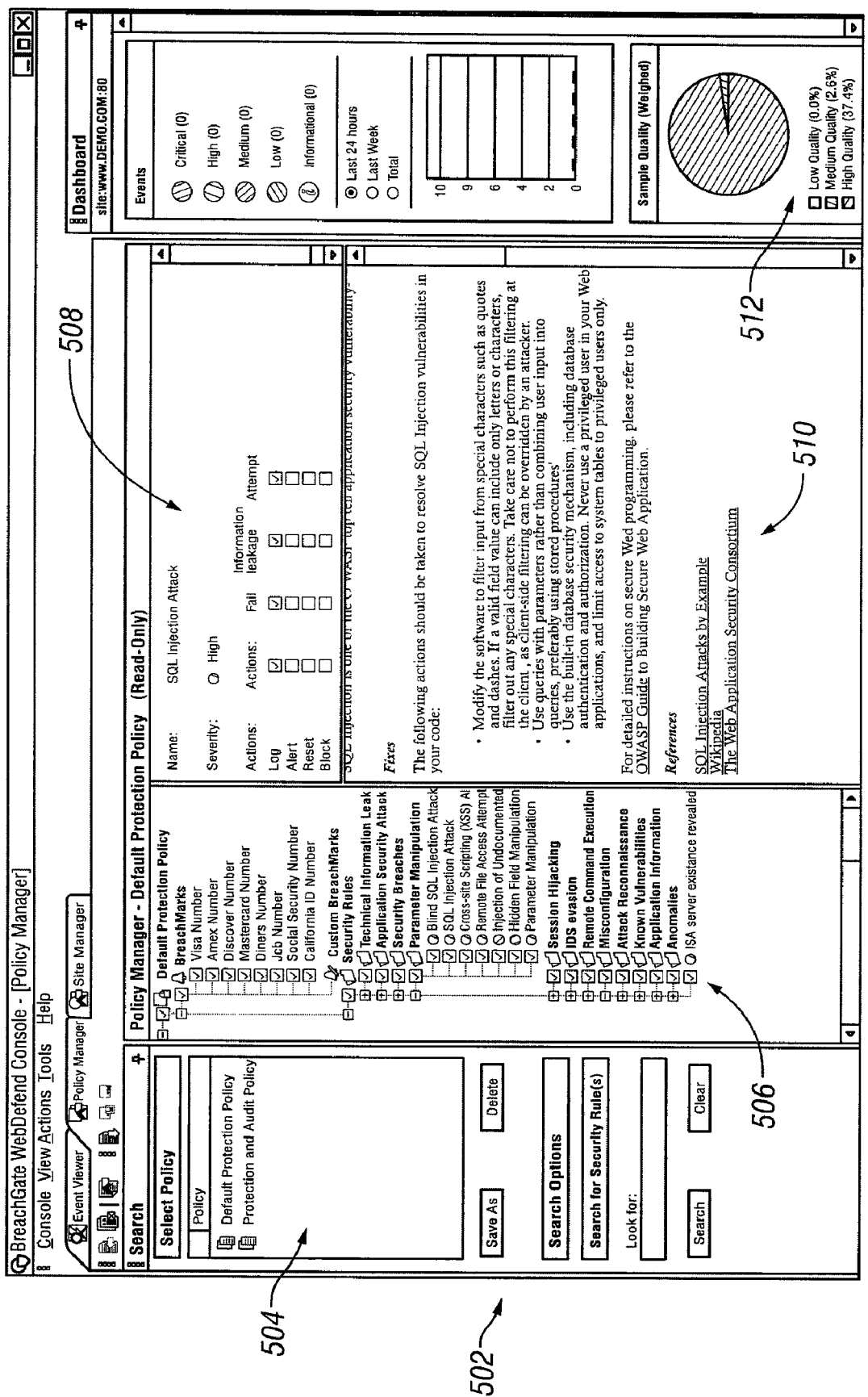
FIG. 5 is a display of an example policy manager display generated by the manager console.

FIG. 5 is an example policy manager display 502 generated by the management console. Within the Web application security system, a policy describes the configuration options for the detection engines as well as what responsive action to take when an event is detected. A policy lists the security events that the Web application security system will monitor and the responsive action to be taken if the event is detected. The policy manager display 502 enables administrators to view and configure security policies for a Web application security system, such as the policies stored in the security policy module 312 of FIG. 3. For example, the policy manager display 502 can provide a list of events organized into categories within a tree structure. Each event may be enabled or disabled and responsive actions for each event can be configured such as logging the event, sending a TCP Reset or firewall blocking command, or setting an SNMP trap.

Policies can be standard, out-of-the-box, policies that are configured to provide different levels of protection. Administrators can modify these standard policies in the Policy Manager to create application-specific policies. In addition, administrators can design their own policy from scratch.

The Web application security system can include special patterns, referred to as BreachMarks, which are used to detect sensitive information such as social security numbers or customer numbers in outgoing Web traffic. The BreachMarks, which can be included in the security policies, can be customized to a particular data element that is sensitive to an enterprise's business. BreachMarks allow organizations to monitor and block traffic leaving the organization which contains patterns of data known to represent privileged internal information.

The policy manager display 502 can be used to define and manage the configuration of the Web application security system mechanisms and includes the ability to fine-tune threat responses on a granular level. As shown in FIG. 5, the policy manager display includes a policy window 504 where a network administrator can select a desired policy for use by the Web application security system. The policy manager display 502 also includes a navigation window 506 so that different types of security issues can be tracked and monitored. There is also a policy modification window 508 that allows an administrator to set various responses to a security attack. In the example of FIG. 5, the administrator is able to set how the Web application security system will respond to an SQL injection attack. The policy display 502 also includes a recommendation window, where suggestions for how to modify a network's operation to better prevent attacks are provided. There is also a dashboard window 512 that provides the administrator summary information about the types and severity of various events identified by the Web application security system.

Figure 6:
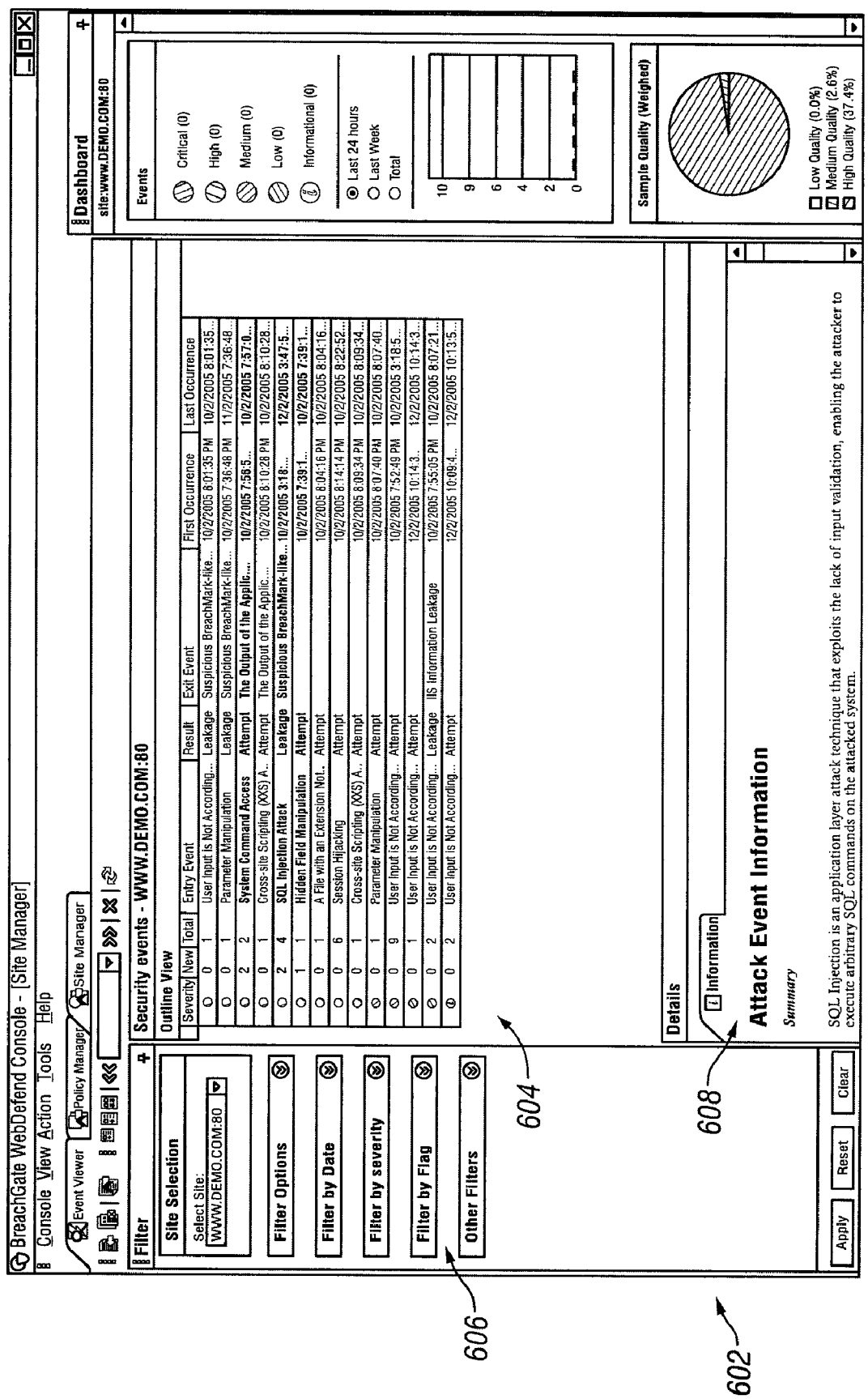
FIG. 6 is a display of an example event viewer display generated by the manager console.

FIG. 6 is an example event viewer display 602, generated by the management console, as might be displayed on the event viewer 318 of FIG. 3. Within the Web application security system, the event viewer display 602 console can include a real-time event analysis module. The event viewer display 602 includes an event detection window 604 with a list of events detected by the Web application security system. This list may include the date, the URL affected, and names both the entry event for the incoming attack as well as any exit event detected in the server's response to the attack.

In section 606, each selected event may be described in detail, including an event description, event summary, and detailed information including threat implications, fix information, and references for more research. In addition, the event viewer may provide administrators a listing of the reference events reported by the detection engines to determine this event has taken place, the actual HTTP request sent by the user and reply sent by the application, as well as a browser view of the response page. This detailed information allows administrators to understand and verify the anomaly determination made by the various detection engines.

The event viewer display 602 can also include a filter window 606 where an administrator can setup various filters for how events are displayed in the event description window 604. There is also a detail description window 606 where detailed attack information is provided to the administrator. The event filter display 602 may include filters for date and time ranges, event severity, user event classifications, source IP address, user session, and URL affected.

Returning to FIG. 3, the Web application security system can also provide a full range of reports 320 for network administrators, management, security professionals, and developers about various aspects of the security of a Web application. For example, reports can provide information about the number and types of attacks made against corporate Web applications. In addition, reports can include information with lists of attacks and techniques to assist in preventing them from occurring again. Also, application developers can be provided reports detailing security defects found in their applications with specific recommendations and instructions on how to address them.

Application Learning System (ALS)

An application learning systems (ALS) as may be performed in the adaptation module 350 in FIG. 3 is described

TABLE 1

| | |
|---|---|
| Range Types | |
| Option | Meaning |
| PROPERTY_REF | The ALS can define ranges according to Property-REF calculation only. |
| STD_DEV | The ALS can define ranges according to STD-DEV calculation only. |
| PROPERTY_REF_AND_STD_DEV | The ALS can define ranges according to both Property-REF and STD-DEV calculation. |

Generally a range violation event should not be generated if input length is covered by one of the range types available. In addition, an event should not indicate which range type (i.e. produced by Property-REF or STD-DEV) was violated. To reduce the number of events during a first phase, or an initial policy phase, set with high values range violation can be used. Table 2 below lists possible range values:

TABLE 2

| | | |
|---|---|---|
| Range Values | | |
| Name | Type and Range | Default (current default) |
| Max URL length (before query) | 1-4046 | 2000 (512) |
| Max query length | 1-4046 | 2000 (800) |
| Max parameters | 1-MAX_PARAMETER_NUM (1000) | 100 (40) |
| Max parameter length | 2-4096 | 1000 (500) |
| Max number of headers | 1-100 | 50 (40) |
| Max length of a header | 1-4096 | 2000 (1000) |
| Max chunks in content | 1-MAX_REQUEST_CHUNIKS (20) | 20 (20) |
| Rejected strings in headers | String list | |
| Rejected strings in query | String list | - union insert drop delete |
| Rejected strings in content | String list | - union insert drop delete |
| Rejected strings in URL | String list | |
| Rejected strings in normalized URL | String list | /etc/passwd |
| Supported file extensions | String list | |
| Allow no file extensions | Boolean | NO |
| Ignore URL Fragments | Boolean | NO |

The ALS can develop ranges that are based on property reference (Property-REF) calculations of parameters. In addition the ALS can perform standard deviation (STD-DEV) calculation. STD-DEV ranges can be calculated, for example, from the following attributes:
  a) Header length (single range)
  b) Variant Parameter value length.
  c) Page Signature—Content Size attribute.
  d) Page Signature—Number of Forms attribute.
  e) Page Signature—Number of Links attribute.
  f) Page Signature—Number of Images attribute.
  g) Patterns—Permitted Type patterns.

To support debugging, the ALS can support manual retrieval of specific range type (STD-DEV or Property-REF) from the database, as well differentiation between the types. A configuration range (RANGE_ALG) directive for range types can be defined that will support the options listed in Table 1 below:

The following Initial Policy attributes, for example, can be updated according to ALS data:
  a) Maximum URL length (before query)
  b) Maximum query length
  c) Maximum parameters
  d) Maximum parameter length
  e) Maximum number of headers
  f) Maximum length of a header
  g) Supported file extensions In one embodiment, limits can be established in accordance with the highest values handled until reaching a desired phase number and their corresponding requests which result with an acceptable status code. To make sure that limits are not too restricted, a factor can be used. A file extension can be derived from the URL list learned during a first phase. A test can be performed to determine the acceptable file extensions. For example, executable files, with an ".exe" extension, can be removed. In one embodiment, once an extension has passed the test it can be considered valid for the entire site. In other embodiments, extensions are periodically or intermittently tested. Learnt URLs, which their extensions were defined as invalid, should be reported and removed from the system. One technique that can be used to reduce the number of false positives is to divide the event headers into two groups:

1. Self-Protected headers. For each header assigned to this group the ALS acts according to its 3M setting.
2. Protected by Initial Policy. For each header assigned to this group
   a) The ALS acts according to the Initial Policy setting (Protection and Audit modes) for "Max header length".
   b) The 3M for this header are ignored.
   c) The ALS learns an optional range, which is available for use once the header is assigned to the other group.

In one embodiment the ALS can keep sending an event on a new header independent of the group it is assigned to. In addition, events on header violation can be sent according to an audit mode setting and group assignment.

Some headers can be assigned to a "Protected by Initial Policy" group by default. For example, the following headers may default to the Protected by Initial Policy group.

1. accept
2. referer
3. user-agent
4. accept-language
5. accept-encoding
6. cookie To reduce false positives, ranges produced for Page fingerprints, and Patterns can be merged using a clustering mechanism. In one embodiment, clustering can be performed according to the following steps:

a) Sort the distances between ranges by their values, starting from the lowest distance D.
b) Sum the existing ranges into a single value S
c) As long as the ratio D/S is less then or equal to a desired value then
d) Merge ranges that the distance between them is equal to D
e) Increment S
f) Continue to next distance.

In one embodiment, the ASL can maintain a status of the generation process, by:

1. Adding a message to the learning log whenever a new step within the generation process is started. Messages are typically expected for the following data generation steps:
   a) HTTP Constraints
   b) HTTP Headers
   c) URLs
   d) Parameters
   e) Keys (page signatures and patterns)
   f) Cleaning collection tables
2. Maintaining the last generation process status. This can be achieved by:
   a) Adding LAST_GEN_STATUS directive to site block in als.conf.
   b) Updating directive status whenever generation process ends.
   c) Resetting status when clearing site policy.

The ALS can also support a mechanism for change recognition. Three different examples of approaches are defined below that support an application change by the ALS. The first example enables a user to schedule a change; the other two support an internal mechanism. When a change is identified internally by the system, the user has an option to get an event only or allow the system to adopt the change as well.

The user may be able to schedule a change for a specific application rule, indicating that URLs under this rule are about to change every pre-defined period of time. The following options are typically available:

a) Single change plus date plus time
b) Every week plus date plus time
c) Once a month plus date plus time Usually, as default, no change is scheduled for any of the rules. When a change is identified, according to a schedule, the following steps occur:

a) Collected data, if exists, for resources under this application rule is removed.
b) Policies (URLs and their objects—parameters, keys) are shifted aside for backup.
c) The ALS handles resources located under this application rule as if it is in first learning phase, which means that events are not generated for resources under this rule.

In one embodiment the ALS supports an API to allow external mechanism (for example—event correlation mechanism, or signing-API) to indicate a resource change. The API can support a report of a URL change, and a schedule for a planned change. The API can also support indication of whether current policy should be removed. If the ALS was not requested to remove current policy, API should indicate if event generation should be stopped. According to API, the ALS:

a) Waits until the time schedule is met.
b) Produces an event
c) Moves current policy to a backup, starts data collection and data generation for URL, as if it was in first phase. It means that no events are generated for this URL until new policies are generated for URL objects. Or—
d) Keeps current policy and continues generating events (the last is according to API input). Meanwhile it starts data collection and data generation for URL, and eventually prepares a new policy for future use. The new policy will be replacing the current one according to user request.

In one embodiment, the ALS is expected to identify a potential change automatically. In this embodiment the following steps are followed:

1. The ALS maintains a new-policy for resources that are mapped to application rules that were not assigned with a change schedule.
2. A new-policy is generated in the following manner:
   a) Once an object reached high certainty level, and policy was generated for this object the ALS can restart collecting data for a generation of new-policy.
   b) A new-policy is generated according to the same conditions used for the generation of the real policy.
   c) Data should be collected, generated and kept in a mirrored database.
3. Once a new-policy was generated, the ALS can restart a new-policy collection and generation process for this object. When the last is ready for use, it should replace the first.
4. Each URL can maintain a counter that accumulates the number of times an event was generated for object located under this URL according to its current policy, but was not suppose to be generated according to its new-policy if such exists.
5. Once a URL counter is above a specific threshold a change can be identified for this URL.

6. According to user configuration, the ALS:
   a) Produces an event
   b) Shirts URL's objects current policies to a backup version.
   c) If the user configured, it shifts the new-policy to be the current policy for those objects.

Events can be generated in the following scenarios:

1. The ALS identified a change according to manual or automatic scheduling.

2. The ALS was informed on a change by an external mechanism for specific URL.

3. The following messages can be added to the learning log:
   a) Whenever a new-policy is generated.
   b) When the current policy is shifted.
   c) When application rule change schedule takes place.

In an embodiment, The ALS can learn parameters as dates. For example, a date parameter can take any of the following formats Short Date: In all the following formats, Day and Month can be 1-2 characters long and are a valid day of the year, and Year is either 2 or 4 characters long. The slashes can be replaced by dots.
Day/Month/Year (e.g. 15 Feb. 2004)
Month/Day/Year (e.g. Mar. 15, 2004)
Day/Month (e.g. 15/3)
Month/Day (e.g. 3/15)
Year/Month/Day (e.g. 2003 Mar. 15)
Long Date: In all the following formats, Weekday and Month are names of a day in the week and of a month, respectively, and are not case sensitive. They can be either the full name (Friday, January) or the short name (Fri, Jan). Day and Year are the same as in the short date. The commas might not appear.
Weekday, Month Day, Year (e.g. Monday, Mar. 15, 2004)
Month Day, Year (e.g. (Mar. 15, 2004)
Weekday, Day Month, Year (e.g. Mon, 15 Mar. 2004)
Day Month, Year (e.g. 15 Mar. 2004)
Strings like "31/02" (February does not have 31 days) or "Sunday, Mar. 15, 2004" (it was a Monday) will not be considered dates that match the format. Performance wise, this validation should be optional and be enabled/disabled though the general block of the als.conf configuration file. Date format can be extendible, via a configuration file. In addition, configuration can support optional separators list.

When a parameter fits a date format in at least one reference format of its appearances, the ALS can learn it as a Variant parameter of type Date. Except for ranges and character groups, the rest of the information that is normally learned (this can include the number of appearances in a request and whether it is in the query or in the content). This information can be used when validating the parameter.

In an embodiment, an event can be generated when a parameter, which is supposed to be a date, arrives in a format that does not match any of the date formats. The event description can be: "Date parameter received invalid value." The event can contain the parameter's name and value.

In an embodiment, when an object is assigned with a "data protection" flag the following actions can be taken:
   a) Events that already exist in the database and relate to this object are masked.
   b) Previous ALS data that was collected for this object is removed.
   c) Future events that contain object data should be produced while having data masked by asterisks ('*').

Typically, headers that are marked with "data protection" flag, but are protected by Initial Policy will not be masked. The event mechanism can support the masking of parameter/header data as part of the logged request. In one example the initial policy can block a header that's not "protected by initial policy" if it's too long. In this case its data will be exposed.

The user can be exposed to different severity levels, for example, three levels represented by High Medium/Low. To allow flexibility for events correlation process, the severity levels can be mapped internally into severity ranges. Examples for mapping of internal ranking to user presentation are listed in Table 3 below:

TABLE 3

Example Severity Levels

| Severity Level | Range |
| --- | --- |
| High | 10 < L |
| Medium | 5 < L <= 10 |
| Low | L <= 5 |

Events produced by the ALS can be assigned with an internal severity rank. The events mechanism supports submission of event severity as well.

Even removal allows the user to remove events that are no longer valid once a single event was handled/fixed by the user. For example, assume the "Accept" header has a max length value of 25, and there are 3 events for the header "Accept" indicating "header is too long—value received is X", where X is 30, 35, 40. or other desired value. Once the user updated the header settings to 35, the user can request that the system remove invalid events and, in this way, the first two events (30, 35) will be removed.

An Auto Remove API can test if an event was properly handled, and considered not valid according to current configuration. In case of valid state, the API should query the ALS for the construction of the SWL query.

Collaborative Detection Module

The following discussion provides additional detail of the collaborative detection module 308 illustrated in FIG. 3. As noted in the discussion of FIG. 3, web traffic flows to the collaborative detection module 308 where the traffic is analyzed. The traffic is analyzed by a behavior analysis engine 370 in the context of appropriate application behavior compared to the applications' security profile. If an anomaly is discovered the traffic is passed to one or more of the multiple threat-detection engines included within the collaborative detection module 308. The multiple threat-detection engines work synergistically to deliver comprehensive Web application protection that spans a broad range of potentially vulnerable areas. By working together the multiple threat-detection engines are able to uncover threats by analyzing them in the context of the acceptable application behavior, known Web attack vectors and other targeted Web application reconnaissance.

Behavioral Analysis Engine

The behavioral analysis engine 370 provides positive validation of all application traffic against a profile of acceptable behavior. A security profile of acceptable application behavior is created and maintained by the adaption module 350 which monitors Web traffic and continually updates and tunes a security profile module 352 that maintains the security profiles of applications. A security profile of an application maps all levels of application behavior including HTTP protocol usage, all URL requests and corresponding responses, session management, and input validation parameters for every point of user interaction. All anomalous traffic identified by the behavioral analysis engine 370 is passed to one or more threat detection engines to identify any attacks and provide responsive actions. This ensures protection from all known and unknown attacks against Web applications.

Signature Analysis Engine

One threat detection engine in the collaborative detection module 308 can be a signature analysis engine 372. The signature analysis engine 372 provides a database of attack patterns, or signatures, for known vulnerabilities in various Web applications. These signatures identify known attacks that are launched against a Web application or any of its components. Signature analysis provides a security context for the anomalies detected by the behavioral analysis engine 370. When attacks are identified they can be ranked by severity and can be responded to with preventative actions. This aspect of the Web application security system provides protection from known attacks against Web applications, Web servers, application servers, middleware components and scripts, and the like.

A signature is a combination of terms and conditions, that when fully met define a security issue or other meaningful event (e.g. server technology). Examples of main terms and conditions include patterns and their way of appearance in different contexts of the request/reply. For example, matching a request-reply pair for a specific signature is one technique of specifying that terms and conditions defining a signature where met by a request-reply pair. Examples of signatures include:

CVE signature #1999-0736: the term is the appearance of the string "/msadc/samples/" at the normalized URL:
The appearance of the string "ADODB.Recordset . . . error . . . size" at the reply content.

Signatures may also be based on matching predetermined patterns against data, at specified locations, in the request-reply pair. For example, matching a pattern for "onclick" against request content. The patterns can be either a simple pattern (i.e. a string) or a regular expression. In general, pattern matching technology may be less efficient when matching regular expression as opposed to matching simple patterns. Therefore, it is usually preferred to use simple pattern over regular expression.

Following are examples of locations within the request-reply pair where signature patterns can be matched against:
1. URL.
2. Normalized URL.
3. Parameters values.
4. Request normalized parameters names.
5. Request normalized parameters values.
6. Request headers values.
7. Request headers names.
8. Request specific header (with provided name).
9. Request content.
10. Reply content.
11. Reply HTML title.
12. Cookies (OTB).

In one embodiment, a signature can be composed of matching one or more patterns with various relations. For example, a relation may be that all patterns should appear, X out of Y patterns should appear, a distance between patterns should be Z, etc. Search technologies can include:
1. Simple pattern/s match—pattern/s that appear in the requested location. Each pattern is configured with a separate location. No special relations between the patterns are required.
2. Complex Patten search—Complex Pattern is a sequence of patterns with relations of words skip or characters skip between them. One example of word skip is to search for patterns that appear with the specified number of words between them. An example search would be for a pattern of "SQL" and "error" with a work skip equal to 1.

In the example the string "SQL syntax error" matches the search, while the string "SQL error" does not match. Search patterns can also be setup where the number of words between search terms can be up to a desired number. For example, a search can be for "SQL" and "error" with a word skip value of "up to 1." In this case both the string "SQL syntax error" and the string "SQL error" match this search. It is noted that a word may be a sequence of characters. The characters that can be included in a word are configurable. The default characters are (a-z, A-Z, 0-9). Another example of a search pattern includes characters skip-patterns where a number of characters between appearances of selected characters can be specified up to a desired value.

Word boundary is another type of search pattern. In this type of search there is a match of the pattern only if its requested boundaries are not alphanumeric (a-z, A-Z, 0-9). In addition, the search can specify whether it is referring to the left boundary, the right boundary, both or either. There can also be a weighted search. In a weighted search a list of complex patterns can be specified such that at least a pre-defined number of patterns should appear in order to have a match.

When a signature is matched, a signature basic event may be issued with a parameter indicating the signature type. Examples of basic events that are "signature basic event" (SBE), include one for a request signature and another for a reply signature. These event parameters can be included in the signature id. The SBE is generally available for the correlation engine.

In one example the signature analysis engine support signature updates. Examples of signature updates include the following:
Add new signature;
Remove an existing signature;
Change an existing signature definition.
Examples of signature definitions include the following:
Identifier—unique id;
Severity;
Type (Security Signature, Server Technology etc.);
Request/Reply Signature;
List of patterns and for each its following attributes:
Pattern string or regex (if type is regex);
Pattern name (can be "bogus" identifier);
Patterns type (regular/regular expression);
Pattern sequential number;
The location in which the patterns should be search in;
Whether should check pattern for its boundaries;
Whether the pattern must appear or must not appear (i.e. pattern or NOT (pattern)).
Definition of Complex Patterns;
Weighted Search definition;
Extracted data information.

As noted, a Complex Pattern is a sequence of patterns with relations of words skip or characters skip between them. Examples of various skip relations include:
Words skip relation—the relation specifying the number of words that should appear between two numbers.
"Up To" words skip relation—specifying that the number of words between the appearances of the provided patterns should be up to the provided number.
"Up To" Characters Skip—specifying that the number of characters between the appearances of the provided patterns should be up to the provided matter.

Signature configuration can also include extracted data information. In a typical example the extracted data information includes two items:
1. Regular expression representing the data that can be extracted from the request/reply.
2. Search Location: the location that the provided regular expression should be matched against. The matching can be done either from the first appearance found in that location or from the beginning of the location as will be set in the HLD.

An example of the operation of the Signature Analysis Engine is described. Upon startup signatures are loaded from a definition file and updated in a signature database. Upon initialization the following may be done:
1. Delete Signature: a signature that exist in the database and is not included in the current definition file is deleted;
2. Add Signature: a signature that does not exist in the database and is included in the current definition file is added;
3. Update Signature: a signature that exists both in the signature database and in the current HML definition file is checked to see whether its definition should be changed;

The signature analysis engine can then check the request/reply for signature matches. In one example the signature matching itself may be done according to the following phases:
1) Use the search module (patterns manager) for the search of all specified patterns for all signatures;
2) Only if one or more of the patterns is found, process the results;
3) For each signature, add an appropriate event (SBE) in case the signature is matched.

A signature basic event file can include the following:
Id: SIGNATURE
Short Description: "Signature was detected at the request*"
Long Description: "The signature % SIGNATURE-NAME % was detected at the request*"
Change Detection flag: off
Policy Element (for update profile rule): NONE
CE Key: % PARAM_VALUE(SIGNATURE, SIGNATURE_ID)%
Security Event Flag: true It is noted that in a reply signature basic event the word "request" should be replaced with the word "reply".

Protocol Violation Engine

The collaborative detection module 308 can include a threat detection engine referred to as a protocol violation engine 374. The protocol violation engine 374 protects against attacks that exploit the HTTP and HTTPS protocols to attack Web applications. Web traffic is analyzed by the behavioral analysis engine 370 to ensure that all communication with the application is in compliance with the HTTP and HTTPS protocol definitions as defined by the IETF RFCs. If the behavioral analysis engine 370 determines that there is an anomaly, then the traffic is analyzed by the protocol violation engine 374 to determine the type and severity of the protocol violation. The protocol violation engine 374 provides protection against attacks using the HTTP protocol, for example, denial of service and automated worms.

Session Manipulation Analysis Engine

Another threat-detection engine that can be included in the collaborative detection module 308 is a session manipulation analysis engine 376. Session manipulation attacks are often difficult to detect and can be very dangerous because cyber-criminals, such as hackers, impersonate legitimate users and access functionality and privacy data only intended for a legitimate user. By maintaining all current user session information, it is possible to detect any attacks manipulating or hijacking user sessions, including session hijacking, hidden field manipulations, cookie hijacking, cookie poisoning and cookie tampering. For example, a state tree of all user connections may be maintained, and if a connection associated with one of the currently tracked user's session jumps to another user's session object, a session manipulation event may be triggered.

a. Cookies

Cookies are a technique used by applications to save state data between two separate Http request/replies. The server sends a set-cookie header in its reply and the client sends back a cookie header in the following requests. It is expected that the cookie header will appear in the request with a value that is equal to the value of the matching set-cookie header that appeared in the previous server reply. When receiving a server reply, the parser will find all the "set-cookies" headers in it. These will then be stored in the session storage by the system. When receiving the following request, the parser will find all the "Cookie" headers in it. During the system validation of the request, the cookie headers received will be compared to the "set-cookie" in the session storage.

The system validation can be separated into minimal validation and regular validation. A minimal validation occurs when a cookie has low Sample Quality (the process of learning the cookies has not completed yet). During this time, the cookie will simply be compared to the set-cookie and an event will be triggered if they do not match.

In addition, the fact that the two cookies matched or not will be learnt as part of the system collection/adaption process. After enough appearances of the cookie, the generation will turn the cookies' certainty level to high and mark if the cookie needs to be validated or not. Once the cookie's Sample Quality turns to high, it will be validated only if it was learned that the cookie value matches the set-cookie that appeared before.

When receiving a server reply, an http parser will parse the reply headers and collect all the set-cookie headers. Then all the set-cookie headers are saved in the session storage. The cookie parts that will be saved are typically the name, value, path and expiration.

In one embodiment, a cookie's expiration can either be '0' or a date. A '0' or no expiration means this cookie is a transient cookie and it will not be saved after the browser session ends. When the expiration has a date set for it, it is considered a persistent cookie.

After an initial learning phase, new set-cookie headers found in the server reply will also trigger an event. The event will typically include the cookie name and path. The value of a Cookie in a request can also be compared to the value of cookie found in the session storage. Possible results of comparison include:
No Session Data (No sessions in site, no session for request, no data in session storage)
New Cookie with no matching Set-Cookie
Known Cookie with no matching Set-Cookie
Value of Cookie different than value of matching Set-Cookie
Value of Cookie is equal to value of matching Set-Cookie
Possible outcomes of the matching process can include:
Did the cookie appear with a matching set-cookie?
What type expiration did the cookie appear with? (persistent, transient)

(if yes to matching cookies) Did the value of the Cookie match the value of the matching set-cookie?

Counts associated with cookies can be collected. For example:

"Cookie Access Counter"—number of times this cookie appeared. This is actually the number of times the cookie appeared when session data was available (session id was not "No Sessions Supported").

"Cookie appeared with matching set-cookie"—number of times the cookie appeared with a matching set-cookie.

"Cookie value matched value of set-cookie"—number of times the cookie value in the request matched the value of the set-cookie in the session storage.

During policy generation, the security system can determine which of the cookies need to be validated as cookies and which of the cookies can appear without a matching set-cookie. In addition, the expiration type of the cookie can be set to Persistent, Transient or Mixed. If the cookie appeared more than a desired number (COOKIE_EXPIRATION_REF) of times as persistent, it will be of expiration type persistent. The same will apply to transient. If both conditions apply, the cookie will be of type mixed.

In one example, to decide if a cookie needs to appear with a matching Set-Cookie, it is expected that most of the cookie appearances when sessions were available appeared with a matching Set-Cookie header in the session storage. Another possibility is that the cookie is a transient cookie (not persistent and not mixed). In other words, a cookie is expected to appear with a value that matches its expected Set-Cookie if it is transient.

After receiving a cookie header in a request, the security system will try to find that cookie in its databases. The cookie may be validated in a different way if it is found as a high certainty cookie, as a low certainty cookie or not found at all as a cookie. Example validation techniques for cookies with different certainty levels are explained further below.

In one embodiment, when validating a high certainty cookie, the security system will typically check:

Is the cookie supposed to come with a set-cookie? If yes, make sure there is a matching set-cookie in the session storage and trigger an event if not.

Is the cookie's value supposed to match the value of the matching set-cookie? If yes, make sure there is a matching value for the cookie in the session storage and trigger an event if no.

In an embodiment, minimal validation can be performed when there are sessions defined in the site and session related events are allowed. When validating a low certainty cookie, the security system will typically check cookies that appeared with a matching set-cookie. The value of the cookie can be compared to the value of the set-cookie. An event can be triggered if they do not match.

If a cookie appears for the first time without a set-cookie, the cookie can be added to the site as a new cookie (with path=NULL). If the same cookie appears later in a set-cookie header, the path will be set to the actual path. An event will be triggered as well: "Unexpected Cookie." Following are some scenarios where an event can be triggered.

Collection
New Cookie at server reply—a new cookie is received from server at the server reply (triggered only after initial period)
Cookie appeared at the Set-Cookie header without the Http Only flag (this event will replace the current Http Only event which is triggered every time the cookie appears).

Validation
High Certainty
Cookie Hijacking—Cookie appeared without expected Set-cookie
Cookie Tampering—Cookie value did not match the value in the set-cookie received in the session.
Low Certainty
Suspected Cookie Tampering—Low Certainty Cookie value did not match the value in the set-cookie in the session.
Unexpected Cookie—new cookie header appeared with no matching set-cookie.

b. Hidden Fields

In certain URL (source URL) the HTML form tag <form> can appear with specific action that points to other URL (target URL)<form action="target URL">. A target URL can be reached, for example, when pressing the "submit" button from a source URL. On the source URL as part of the <form> various HTML controls (input fields) can appear. These input fields have attributes that describe their type and value. This data will be sent to the target URL in the form of parameters clicking the submit button, i.e. the fields of the source URL are parameters of the target URL.

Some fields of the URL are displayed by the browser for the user to fill with data; then when pressing the submit button, a request for the target URL is generated, while passing these fields as parameters. Examples for such fields are: name, age, date. Other fields may be of type "hidden" and have a value set for them by the server when the reply page is sent; this means that these fields are not displayed by the browser and the user does not see them. However, these fields are also sent as parameters to the target URL. The value sent together with the hidden parameters is expected to be the same value which the server sent in the reply of the source URL. Examples for such fields can be product-id, product-price.

Another type of input field is a "password". These fields are displayed to the user, which fills them with data. Browsers do not show the value of password type parameters when it is entered and show "***" instead. It is expected that parameters that are of type password will also have another attribute in the source URL reply such as "auto-complete=off" meaning, the browser cannot use the auto complete feature and save previous values entered to the field.

In some cases, client side scripts, such as java scripts, can modify the value of the hidden field. In these cases, even though a field is marked as hidden its value does not match the expected one. When receiving a reply, the system searches for target URL forms with hidden fields. It will save data on the hidden fields of each URL and their expected values in the session storage. During the Adaption process, once the target URL is accessed, the security system will check if the value of the hidden fields matches one of the expected values stored earlier. While generating a policy for a parameter, the system will check if the field was learned as a hidden field enough times and decide if this field is to be validated as a hidden field or as a regular parameter. During the validation, values of parameters that are validated as hidden fields will be compared to the values that were retrieved earlier and were stored in the session storage.

As part of this processing, recognizing fields as password types is also supported. The fields will be recognized as password type during the parsing of the reply. If a field was learned as type password enough times it will be marked as such. Fields of type password will be generated as bound type parameters with their lengths and character groups. The security system can generate an alert, or event, when a field in the target URL is marked as password type, but the auto-complete flag for it is not turned "off".

When parsing a reply of a source URL, the session manipulation analysis engine will monitor the session. If it is a legal session (not a constant session id) a pattern manager will be used to find the "form" sections in the reply. Each form section represents a different target URL. The target URL will be normalized with regard to the source URL (besides regular normalization relative paths that don't begin with '/', such as "../" will be relative to the source URL). In case there is a Base tag in the reply, the target URL will be normalized with regards to the given base and not the source URL. In one embodiment all server replies will be parsed, depending on the content type. Only non-binary content types will be parsed. When storing a target URL in session storage, the URL-id can be used instead of the URL-name. This assumes that the target URL is not a new URL and a URL-id exists. For each target URL, the session manipulation analysis engine can use the pattern manager to get all the URL fields of type hidden and all the URL fields of type password. The follow list includes example fields that can be inserted into the session storage under the targeted URL:

Hidden fields will be inserted together with their values. In case more than one value exists for a hidden field (either from a different reply from the same source URL of from a different source URL), all values will be stored as part of the hidden field. There will be a limit on the maximum number of values expected. There will also be a limit on the maximum value size to save, for values larger than this size the MD5 of the value will be stored.

Query parameters—Query parameters can be added to the target URL in the source URL. They will be treated as if they were hidden fields. Example: www.breach.com?username=ramim—the username will be treated as a hidden field of the Ur with value "ramin".

Password fields will be inserted without their values. In addition, the pattern manager will be used to check if the flag "auto complete" is marked as "off" for that field.

In the situation where there is more than one hidden field in the target URL, each combination of field values can be grouped and treated together. For example, if there are two hidden fields, field_a, field_b which were accessed in one request with values, val_a and val_b, and in a second request with values, val_1 and val_2, acceptable combinations will be val_a & val_b or val_1 & val_2 and val_a and val_2 will not be accepted. The grouping of values will occur during the validation. During the collection and generation each hidden field will be treated separately.

When learning a request on a URL, the security system can check the session id it gets from the session manager. If it is a legal session (not a constant session id), then it checks if the URL exists as a target URL in the session storage. If the URL is a target URL in the session storage, the system checks each of the request parameters to determine if they appear in the session storage as:

Hidden fields—ALS will learn the fact that they are hidden and if the value for the field given in the request matches the one of the values in the session storage.

Password fields—ALS will learn the fact that the parameter is of password type. ALS will also learn if it appears without the "auto-complete" flag turned off.

The session manipulation analysis engine can generate the following counters per parameter (if condition is true):

"parameter accessed with sessions available"—number of times this parameter was accessed when session data was available (session id was not "No Sessions Supported").

"parameter is hidden"—number of times the parameter was found as a hidden field.

"value matches for hidden parameter"—number of times the value in the request matched one of the values in the session storage for the hidden field parameter.

"parameter is password"—number of times the parameter was found as a password field.

During security policy generation, the security system can decide which of the parameters are hidden fields and whether they need to be validated as hidden fields as well as which of the parameters are of type password. In order to decide if a parameter is of type hidden (or password) it is checked to see if the parameter was accessed when its URL was the target URL and the parameter was marked as a hidden field. In order to decide when a hidden field is to be validated as a hidden field, it is checked to see if it appears with valid session data and the value at the request matched the value at the session storage.

Two examples of when a parameter can reach the number of requests necessary to turn it into a high certainty parameter and there is still not enough data to decide whether it is hidden or no (or password) are:

In all of the accesses to the parameter, none were at the time session data was available. This could happen when sessions are not available at the site for some reason.

Although session data was available in part of the request for this parameter, not enough requests were received when session data was available (e.g. –300). As a result, a comparison will not be meaningful since both numbers are small compared to the number of times the parameter was accessed (defaulted at 5000). This case should not really happen, since session data should be available after few requests (1000 per site).

Checking for both cases can include checking if a parameter is hidden or password only if enough requests arrived with session data "parameter accessed with sessions available" higher or equal to a desired value. Once a parameter turns to high certainty, a check will be made if the parameter was a password without its auto complete flag turned off. If so, an event will not be triggered. This event will typically be generated only once, when the parameter turns to high. If the parameter was ok (not password type or it was password type and the auto complete flag was turned off) at the beginning and then (after the generation) there was a change, an event will not be triggered.

When validating a parameter, it can be checked to determine if it should be validated as a hidden field. If so, then the value in the request can be compared to one of the values in the session storage and generate an event if they do not match. If the values do not match, the value can also be validated as if it were not a hidden field (where additional events may be triggered). In the situation where there is more than one hidden field in the target URL, validation can be on acceptable combination of values. If the parameter is not a hidden field or it was not learned to be validated as a hidden field, validation can be the same as for other parameters. Password type fields are generally treated according to their policy, except that their type will usually be bound.

Once a target URL is received with session data, the values of parameters with low certainty which were marked as hidden during the source URL reply are compared with the session storage. If they do not match an event will be triggered. This check can be done on all fields marked as hidden in the reply and ignore the fact that java-script may change the hidden value. This check may not catch fields which are supposed to be hidden but are received not in session or without passing in the source URL first (since they are hidden was not learned yet). Following are examples of when an event may be triggered.

Hidden field did not match expected value—the value of the hidden field in the request did not match one of the values in the session storage.

Hidden field received without expected values in session—a parameter which should have been validated as a hidden field was received without expected values. This could happen in two cases:

This request has no valid session id.

The request has a valid session id but there are no expected values for it in the session storage.

Hidden field events described above are in the category of "Hidden Fields Tampering". Meaning a parameter that should have been validated as hidden was not received with the correct value. Once one of these events is triggered, the parameter can also be validated as a regular type parameter (list, template, bound, etc.), where additional events on it may be triggered.

Generation events will typically be triggered once per parameter during a generation that turned the certainty of that parameter to high.

Password field appears in form with auto complete not turned off—In a reply of a source URL, a target URL appeared with a password field that did not have the auto complete flag turned off.

Parameter was not learned as hidden, even though it was a hidden field in part of the requests. This event will be triggered if the field was hidden and the correct value matched more than HIDDEN_FIELDS_ALERT_PERCENT percent of the requests but less than (1-REF) requests.

Parameter was not learned as password, even though its type was learned as password in part of the requests. Similar to the above events.

A new field may be added to existing events on parameters: html-type. This field can be "password", "hidden", "hidden-dynamic", "none". "Hidden-dynamic" refers to a field which hidden, but is not validated as hidden (e.g. a java script changes it).

Validation events on hidden fields can be correlated with other events on the parameter, if such will be triggered. The main event should be the hidden field tampering. One of the fields in the validation events can be the session id of the request, if such existed. If the session id is '0', the request was not part of a session. The correlation can change the event if session id is '0' and group the event with other session related events, if the session id is valid. Existing validation events on password type parameters should have higher priority.

New validation events on hidden fields may be false positive events if the parameters were learned to be validated as hidden but are changed by scripting. Validation events on hidden field that were triggered when the parameter was with low certainty may be false positive if they are changed by scripting (since there is no learning at that point). If parameter is validated as a hidden field, this may actually reduce the number of events in the system, since the parameter is validated using its type (bound, list) only if it does not match an expected value in the session. Password type parameters will not be validated as bound parameters with char groups. This will cause the ALS not to handle properly password fields with a limited number of values that could have been validated as list.

c. Passive Session Tracking

A predefined list of regular expressions that can identify session IDs in requests and replies is defined. A generation process will choose a subset of these session ID definitions as the ones that are used to identify sessions. These session IDs will be searched for in all requests and replies. The session IDs will be extracted from the request using a combination of the request's objects (such as cookies, parameters, etc), and general regular expressions that are used to extract specific session data. Each set of regular expressions defines which part of the request it runs on, and can be used to extract a value and optionally extract up to two names. In addition, if the regular expression is being searched for in the URL, it can also extract the indexes of an expression that needs to be removed from it. Regular Expression Sets can have one of the following types:

1. Param: Includes two regular expressions. One is searched for in the parameter name, and the other in its value.
2. WholeCookie: Includes two regular expressions. One is searched for in the cookie name, and the other in its value (the entire cookie value, without additional parsing).
3. CookieParam: Includes three regular expressions, and works on cookies that have been separated correctly into names and values. The first expression is on the cookie's name, the second—on the cookie's parameter name, and the third on the cookie parameter's value. For example, in the cookie header: "Cookie: mydata=lang=heb|sessionid=900" the cookie's name is "mydata", the two parameters are "lang" (with the value "heb") and "sessionid" (with the value 900).
4. SemiQuery: Includes one regular expression that is run on the query that comes after a semicolon. For example, in the URL "/a.asp;$jsessionid$123", the regular expression will run on the underlined part.
5. NormURL: This regular expression runs on the normalized URL. It may return indexes, in which case the part of the URL that is between these indexes is removed. This is done to support sessions that are sent as part of the URL but should not be included in the URL when it is learnt by the ALS.
6. Header: Includes two regular expressions. One is searched for in the header name, and the other in its value.

Table 4 list some example definitions of a few regular expression sets that can be used inside the security system.

TABLE 4

Sample Definitions of Expression Sets used in the security system

| Index* | Type | Regular Expressions | Parenthesis | Description |
|---|---|---|---|---|
| 1 | Param | Param Name: (jsessionid) Param Value: (.*) | 1 - Name 2 - Value | Detects the jsessionid parameter. |

TABLE 4-continued

Sample Definitions of Expression Sets used in the security system

| Index* | Type | Regular Expressions | Parenthesis | Description |
|---|---|---|---|---|
| 2 | SemiQuery | \$(jsessionid)\$(.*) | 1 - Name<br>2 - Value | Detects a less popular variant of jsessionid in the semi-query. |
| 3 | CookieParam | Cookie Name: (.*)<br>Cookie Param Name: (.*session_id.*)<br>Cookie Param Value: (.*) | 1 - Name$_1$<br>2 - Name$_2$<br>3 - Value | Detects cookies that have parameters that contain the string session_id in their name. |
| 4 | NormURL | \/(\(([^/]*)\)\/) | 1 - Index<br>2 - Value | Detects URLs with a bracketed session ID (such as /abc/(123)/a.asp) |

*The index is a numeric identifier of the regular expression set.

Usage Analysis Engine

Still another threat detection engine that can be included in the collaborative detection module 308 is a usage analysis engine 378. The usage analysis engine 378 provides analysis of groups of events looking for patterns that may indicate that a site is being examined by a potential attacker. Targeted Web application attacks often require cyber-criminals to research a site looking for vulnerabilities to exploit. The usage analysis engine 378, over time and user sessions, can provide protection against a targeted attack by uncovering that a site is being researched, before the site is attacked. The usage analysis engine 378 correlates events over a user session to determine if a dangerous pattern of usage is taking place. An example of this analysis is detecting a number of low severity events resulting from a malicious user probing user entry fields with special characters and keywords to see how the application responds. These events may not raise any alarms on their own but when seen together may reveal a pattern of usage that is malicious. Another example of this analysis is detecting brute force login attempts by correlating failed login attempts and determining that threshold has been reached and thus, the user may be maliciously trying to guess passwords or launching a dictionary attack of password guesses at the web application. Another example of this analysis is detecting scans by security tools when an abnormal amount of requests are received in the same session. Yet another example of this analysis is detecting http flood denial of service attacks when an abnormal number of duplicate requests are received in the same session. This analysis can be easily extended to detect distributed denial of service attacks by boot networks correlating multiple individual denial of service attacks.

Exit Control Engine

Yet another threat detection engine that can be included in the collaborative detection module 308 is an exit control engine 380. The exit control engine 380 provides outbound-analysis of an application's communications. While incoming traffic is checked for attacks, outgoing traffic may be analyzed as well. This outgoing analysis provides essential insight into any sensitive information leaving an organization, for example, any identity theft, information leakage, success of any incoming attacks, as well as possible Web site defacements when an application's responses do not match what is expected from the profile. For example, outgoing traffic may be checked to determine if it includes data with patterns that match sensitive data, such as a nine digit number, like a social security number, or data that matches a pattern for credit numbers, drivers license numbers, birth dates, etc. In another example, an application's response to a request can be checked to determine whether or not it matches the profile's variant characteristics.

Web Services Analysis Engine

Another threat detection engine that can be included in the collaborative detection module 308 is a Web services analysis engine 382. The Web services analysis engine 382 provides protection for Web Services that may be vulnerable to many of the same type of attacks as other Web applications. The Web services analysis engine 382 provides protection from attacks against Web services such as XML viruses, parameter tampering, data theft and denial of Web services attacks.

Threats detected by any of the above threat detection engines in the collaborative detection module 308 may be communicated to the advanced correlation engine 310 where they are analyzed in context of other events. This analysis helps to reduce false positives, prioritize successful attacks, and provide indications of security defects detected in the application. In one embodiment, the advanced correlation engine 310 can be based upon a positive security model, where a user's behavior is compared with what is acceptable. In another embodiment, the advanced correlation engine 310 can be based upon a negative security model, where a user's behavior is compared to what is unacceptable. In yet another embodiment, the advanced correlation engine 310 can be based upon both models. For example, the user's behavior can be compared with what is acceptable behavior, a positive model, and if the behavior does not match known acceptable behavior, then the user's behavior is compared with what is known to be unacceptable behavior, a negative model.

Application Change Detection

One type of analysis that can be performed by the advanced correlation engine 310 is an analysis to determine if there is a change in the number of events produced for a page. One technique for recognizing a change in a Page (URL) is based on the number of events produced for the URL as well as on the event rate. Unlike a 'Simple Change Detection feature' where the change is detected when event rate has changed, the Application Change Detection takes into consideration the ratio between total number of events for a specific URL and number of requests.

In one embodiment, a system assumes that an application browsing profile, that is the amount of resource hits, might change during the day and week. As a result, the number of events, including false-positives, produced during the day or week might change. In one example when detecting a change, the system assumes one of the following scenarios, and supports both:
  a. The nature of the application was not changed, meaning that the application is expected to be browsed at the same rate and profile like it was before the change.
  b. The browsing profile has changed, which includes the peak time.

When the security system starts its operation, typically no Change Detection is searched for. Once an Initial Adaption period is completed, each URL learnt initiates its "adjustment period", where it calculates the allowed event rate for each URL per time slot. The event rate limit for each URL is usually generated at the end of the "adjustment period." The "adjustment period" can be defined, for example, by the number of successful generations performed. In one embodiment, any URL that arrives after the Initial Period is over will immediately enter its "adjustment period." In other embodiments, a URL that arrives after the Initial Period is over will enter its "adjustment period" at a desired time.

When a change is detected then an event can be triggered. Events with status codes that are not error status codes contribute to the calculating event rate, otherwise the request is likely to be an attack, not an application change. Typically, events can be partitioned into the following groups:
  a. Event on unexpected URL—Once most of the application resources were browsed the number of these events is expected to be significantly low. Incremental change in the number of this event should indicate that additional resources, such as files, were added to the application. It is noted that typically, this type of event can be only be monitored on the Application Level.
  b. Events on unexpected resources (Parameter, Variant)—Once most of the application resources were browsed the number of such events is expected to be significantly low. Incremental change in the number of such events should indicate that additional resources were added to the application.
  c. Events on entry policy violation—These events might result from bad policy, attack, or application change. In this case, an application change refers to changing values of parameters, their number of appearance, or their location within the request.
  d. Events on exit policy violation—These events might result from bad policy, application change, or attack. Application change refers to replacing a static content with another (hash fingerprint), or changing the reply structure (in case of dynamic content, identified by other fingerprints). An attack is less common in this case. Attacks that result with patterns violation should rarely happen, while attacks that successfully replaced a page with another can be identified as a valid change (unless a fine-grained correlation is supported).
  e. System Limitation (Parser) or Application Limitation (HTTP Constraints) events—These events don't result from application change, therefore are not used for the calculation.
  f. Header Related Event (Unexpected Header, Invalid Header Length)—It is assumed that violation of headers policy or any new header learnt have nothing to do with any application change. Besides, when a user takes action to clear the Application or URL he does not expect the Headers policy to be cleared as well.

A technique that can be used to establish whether a Page (URL) was changed is to calculate the allowed event rate for the URL first. The calculation can be based on event rate per time slot relatively to the number of request per time slot. When calculating the allowed event rate per time slot:
  a. Events from "Events on entry policy violation" and "events on exit policy violation" described above are taken into account.
  b. If an event on "security signatures" appears in a request or reply, then it is considered that the request is likely an attack and therefore no events of this request are taken into consideration for calculating allowed event rate. If an event on a "non security" signature appears in the request or reply, the system will count the request, but not the event. This assumes that the events of Signatures are divided into "Security" and "Non security" events.
  c. Total number of requests per time slot should not include the requests that returned error status codes.

In one example the system samples the number of times events are submitted in order to produce a limit which indicates the expected maximum number of events per time slot, for each URL. Calculating allowed event rate for URL is an ongoing process that continues after the limit was set for the first time in order to update itself according to the current event rate. The calculation stops if URL/Application change was detected (Detecting Change) and is not restarted until specific reset (User Scenarios)

Because the security system implements continuous learning, profiles are expected to be generated during operation. Because the number of profiles is dynamic and constantly increasing, so does the number of expected false-positive events. In addition, a user is expected to fix profiles to reduce the number of false-positives. The system takes this into account when generating an allowed event rate. The calculation should take into account the number of profiles existed during the sampling. This can be done by normalizing the number of events with the Sample Quality of a URL.

The system should recognize an application change at both the URL level and Application Level. Once an allowed event rate for URL is generated, the system enters a period where it tries to detect any URL change by comparing the calculated event rate to the maximum allowed rate.
  1. Change Detection at URL Level
    a. A change should be identified at URL once the event submission rate calculated per time slot for specific URL has changed (increased).
    b. Automatic URL relearning is achieved by a directive in configuration file. Once this directive is on and a change was detected at URL level the URL should be deleted (the learning should restart).
  2. Change Detection at Application Level
    a. To establish application change we need to monitor the changes of URLs that belong to the application and new URLs that were added to the application.
    b. A change should be identified once CD_CHANGED URLS % of URLs were changed or CD NEW URLS % URLs was added in last CD_NUM_SLOTS_NEW_URLS slots or both.
    c. A URL is considered new URL, only if it was added to the database, if an event was triggered for 'Unexpected URL' but it was not added to the database due HTTP Constraints Violation this URL will not contribute to the total count of new URLs.

It is noted that if a new long URL is added to the application it will not be detected as a change. On the other hand, if such URLs are allowed to be counted, the situation can occur that Application will show that new URLs were added but actually no such URLs will be in the system.

In another embodiment, a solution of recognizing a change in the Page (URL) can be based on the number of events produced for the URL as well as the event rate. The embodiment can take into consideration the ratio between total number of events for a specific URL and number of requests.

In general, the system assumes that the application browsing profile (the amount of resource hits) might change during the day and week. As a result, the number of events (including false-positives) produced during the day (or week) might change. When detecting a change, system can assume one of the following scenarios, and support both:

a. The nature of the application was not changed. Meaning, that application is expected to be browsed at the same rate and profile like it was before the change.

b. The browsing profile has changed, which includes the peak time.

This change defect feature can be disabled during the Initial Learning period. Because a user is expected to configure the product, configure applications, and handle events during initialization. Once the Initial Learning period is over, the feature can be enabled. Each URL learnt initiates its "adjustment period", where it calculates the allowed event rate for each URL per time slot. The events rate limit for each URL is typically generated at the end of the "adjustment period". The "adjustment period" can be defined by "number of successful generations performed." Any URL that arrives after the Initial Period is over may immediately enter its "adjustment period". When a change is detected, an event can be triggered and a message added to the learning log. Only events with status codes that are not error status codes contribute to the calculating event rate, otherwise the request is likely to be attack, not an application change.

The change detection module will consider a new URL if it was added to the database. If an event was triggered for 'Unexpected URL' but it was not added to the database due HTTP Constraints Violation, this URL will not contribute to the total count of new URLs. The module can alert a change detection once the number of events on the last time slot exceeded the allowed limit. The allowed deviation can be configurable. After the change was detected, the Application can be cleared automatically or a user can perform one of the following:

a. Delete URL b. Clear Application (to which the changed URL(s) belong(s) to)—delete all URLs that belong to the Application, including their policies.

c. Clear all URLs that we identified as changed (new feature)

d. Manually adjust existing polices or the URL (in this case the user is expected to reset the detection)

e. Delete High level parameters—relearn parameters (in this case the user is expected to reset the detection).

Deleting URL or resetting the URL change detection will result in recalculating the change of the application to which the URL belongs (if there is any). The module can assume that some actions are about to be taken, and for that reason expect events from unexpected URL and unexpected resources during the "adjustment period". These events will be generally ignored as part of the limit calculation. As result of the above following should be noted:

The module should not differentiate between massive attack on specific URL and URL/Application change.

The module should not identify a temporary change scenario. (A resource was updated and replaced back with its original version).

A difference is noted between a violation of a policy for a URL when no change in URL was detected and a violation of the policy with a change detected for the URL. The violation of policy in the former case could indicate an attack while in the latter case the violation is related to the change of the page that was detected so it should be grouped and named differently. Therefore different events can be triggered to distinguish between different cases. In the above example, the latter event should generally have a lower security.

When the change detection module detects a URL change, the changed URL should be marked, and when the module detects an application change, the changed application should be marked. An application should show the number of URLs modified and added, even if the system did not decide that the application was changed. The URL should usually indicate a change, and estimated date of change. If a user decides to take some actions, such as deleting or manually fixing existing policies under the relevant URL a after change was deleted, they are expected to 'reset the change detection' feature, meaning acknowledge it. A user can acknowledge a URL change or an application change. If an application is reset then all modified URLs can be deleted or all old URLs can be deleted and leave URLs that are identified as new. Also, a user reset operation can be logged in a site's learning log.

Aspects of Correlating ALS and Signatures

Another type of analysis that can be performed by the advanced correlation engine 310 is to analyze events generated by the behavioral system (Adaption), along with the events generated by signatures that are passed to the correlation system. The signatures events can be used to strengthen the severity of the detected anomaly and evaluate their importance and correctness (and vice-versa).

Many modules can generate Basic Events: HTTP Parser, Session Manager, Application Learning System (ALS) (including ALS generation), Application Signatures (AppSigs), Change Detection Thread, DDPA, and such. Events can be generated and they can also be removed. The Policy Manager and Exception Manager are the two modules responsible for filtering events before inserting them in the Events Database.

Correlating Attack and Result Events

The Correlation engine, or correlation module, typically generates two classes of Correlated Event (CE): Attack CE and Result CE. An attack CE is a CE that has been generated by the Request part of the HTTP connection. A result CE is a CE that has been generated by the Reply part of the HTTP connection. Each result CE is part of one result category out of five categories: Success, Fail, Attempt, Leakage and Informative. Events shown to the user can be 1) Attack CE 2) Result CE and 3) couples of two CE: one Attack CE and one Result CE. Table 5 below provides an example of how the Matrix is built.

TABLE 5

Exemplary Attack/Results Matrix

|  | Result Category | | | |
|---|---|---|---|---|
|  | Success | Failed | Leakage | Attempt |
| Result CE Type Attack CE Type | Potentially successful | ... Unsuccessful Attack with Status Code 404 | ... Mac OS personal sharing over the Internet / Leakage of database table information | N/A |
| SQL Injection | | | | |
| System command injection attack | | | | |
| Cross site scripting (XSS) attack | | | | |
| Remote File access | | | | |
| ... | | | | |

Following the Correlation processing, it might be that not all Attacks/Results events falls into the above table. In this case, the following scenarios are also valid:

a. One Attack CE and Zero Result CE—In this case, the result CE category will be an Attempt but no concatenation will be done in the various description fields.

b. Zero Attack CE and One Result CE—The 'Event' column will show the result name (usually, it shows the Attack CE name) and description will only contain Result CE descriptions. The result category will be defined by the Result CE Type.

c. Two Attack CEs and One Result CE—Two couples will be shown to the user: (Attack1, Result) and (Attack2, Result)

d. One Attack CE and Two Result CEs—Only one attack couple will be shown to the user. The Result CE with the higher severity will be chosen. If both Result CEs have the same severity values, then one Result CE will be picked randomly. The second result will be handled as described in section 2.3.6.2.

e. Two Attack CEs and Two Result CEs—In this case, two couples will be shown with two different attacks. The Result CE with the higher severity will be chosen for the Attack CE with higher severity. Symmetrically, the Attack lower Severity will be associated with the Result CE with lower severity. If both Result CEs have the same severity values, then each Attack CE will be assigned randomly a different Result CE.

f. X Attack CEs and Y Result CEs—The Attack and Result CEs will be sorted according to their severity values and the first Attack CE will be associated with the first Result CE, the second Attack CE with the second Result CE.

It might be necessary to have some CEs that have a description that is not a concatenation of an attack and result description. For example an Attack CE A accompanied by a Result CE B can require to have a description C and not A+B. In this particular case, correlation will group all BEs and this mixed CE will be considered as a Result CE type. Correlated rules can also depend on the request/reply parameters. For example the Status Code of a request might indicate if an attack has failed or succeeded and consequently it can influence the correlated event severity.

Example request parameters include: Status Code, HTTP Method and URL.

URL extension Value

Flag indicating if the Host Value is contained in the Referrer

Flag indicating if the Referrer header exists or not

Flag indicating if the Value of the Host Header is identical to the site name.

In some case, it might be necessary to check the value of the URL extension on the request. For example, a basic event "URL not found" accompanied by the URL extension JPG can be transformed into a correlated event: "Missing Image". In one embodiment, the values for the URL_EXTENSION request parameter are string based and no pre-format is required. In another embodiment, the URL extensions can be assembled into categories, such as, Images (gif, jpeg, jpg . . . ), Text (txt, html . . . ) etc. Use of a Content Type entity header field can also be added to improve the configuration flexibility.

This technique enables, for example, the ability to identify broken links. For example, if the basic event "URL not found" is generated and the host is contained in the referrer, then it can be correlated to a "broken link" correlated event. It might also be useful to identify a broken link for external link or for direct external link to an image. In another example, if the basic event "URL not found" is generated and the host is not contained in the referrer the referrer does exist, then it can be correlated to an external broken link.

Collecting Basic Events

In one embodiment all basic events (BE) can be collected into one correlated event. In another embodiment, desired BEs can be collected into a correlated event. The BEs to be collected may be identified, for example, by their types. In yet another embodiment, the correlation module can be adapted to collect BEs that are classified as Attack BE. It is noted that an Attack BE can be identified as a BE generated by the Request part of the HTTP connection. Similarly to Attack Events the correlation module can be adapted to collect Result BE. It is noted that the Result BE can be identified as BEs generated by the Reply part of the HTTP connection. Typically two categories of events are produces after a correlation process of a HTTP connection: an Attack CE and a Result CE.

In still another embodiment, the correlation engine can associate, for each HTTP request, a change detection (CD) flag. This CD attribute can indicate if the HTTP connection is requesting resources that have been changed. It can also indicate the nature of the change, i.e., if the change was performed on the URL or the application.

CE Type Information

In an embodiment each correlation event (CE) Type is associated with a set of information. The information will be unique for each CE Type and can be accessed, through a Database, by the GUI. A CE group description can include information about parameters of BEs. For example, the group description format can accept the following parameters:

Number of requests that triggered this kind of CE

Maximum/Minimum value of a particular parameter of a BE.

Enumeration of values. This allows different values to be enumerated and concatenate these values in the description.

CE Types may be divided in many categories, for example, Anomaly, Informational Event, Application Life Cycle Management, Application Bugs, Application Security Issues, System Events, Reconnaissance/Espionage, Failed attack attempt, etc. These categories can be displayed in a tree structure in the GUI Policy Manager.

A CE security attribute may be used to indicate the severity of the CE. The severity can be quantified into a value, or scale, for example from 1 to 3, or 1 to 5, representing low severity to high severity.

A CE type Attack/Result attribute may be used to identify Attack CE and Result CE. A CE Type Event Viewer Hidden Flag may be used to indicate if the Event Viewer will display CE of this type. For example, it may be determined to display the CE based upon the severity value.

Many kinds of static information that may be useful to a user can be associated with a CE Type. The static information may be subdivided in many parts for example:

Summary Information (i.e. Security info)

Link Data (reference)

Relevant Technologies

Execution (how the attack is performed)

Implication (Implication of a successful attack to an organization (e.g. violation to government regulation, administrative rights to server, access to internal database . . . ))

Fix (of a successful attack to an organization (e.g. violation to government regulation, administrative rights to server, access to internal database)).

For example, the CE type may be used to indicate a desired action should be taken. A CE Type "Raw Data Log Flag" may be used to indicate that a request that generated the CE should have its raw data logged. The logging flag may have multiple levels, for example:

Never: This CE will not log the raw data of the request/reply even if the site is configured to log raw data.

Normal: This CE will log the raw data even in the case that the site is configure to log raw data. If the raw data exceeds a maximum size then it will be partially saved.

Always: This CE will make the raw data to be logged, whatever is the raw data size.

In one embodiment, if the logging flag is turned on at the site level, then the logging will be performed according to the Raw Data Logging flag of CEs attached to the HTTP request. In this embodiment, the decision algorithm will proceed as following:

1. If all CEs are marked as "never" logging, then the HTTP request/reply is not stored in the database.
2. If there is at least one CE that has the "always" logging flag, then the request/reply will be entirely logged.
3. Otherwise, the request/reply might be logged partially if its compressed data size is over a threshold size.

Variants

Properties of a request/reply, as can be used by the exit control engine 378, are usually not learned for each URL but for subsets of the requests for each URL. The URL may be divided into several variants, and properties of the reply learned for each variant. Each variant is defined by the URL and the parameters and values of this URL. Generally learning the properties of a certain URL's reply includes the following general stages:

a. Collect data about the requests and replies.
b. Go over all parameters of the URL. For each parameter decide whether it has a limited (small) number of options. If so, keep the options and give them ID numbers. Otherwise do not keep the options. This is actually done "on the fly", during the data collection.
c. Go over all requests and replies, and calculate which URL variant each one belongs to. This can be done using a vector that depends on the parameters and their values. The order of the parameters in this vector may be the same, even if different requests arrive with a different order of parameters.
d. The fingerprint and BreachMarks are learned for replies that use the same URL Variant.
e. When validating a reply, its URL variant is calculated and its properties (size, title, etc) are matched with the properties learned from the other requests to the same URL variant.

For example, assume the URL /catshop.cgi can receive the following parameters:

"product": can be one of the following strings: "catnip", "lasagna", "wool", "mouse".

"credit card": can be any credit-card number.

"quantity": can be "1", "2" or "3".

The URL variant of the request "/catshop.cgi?product=mouse&credit_card=1234567890" would be "/catshop.cgi?product=mouse&credit_card=<ANY>". Note, that because credit_card has not been learned as a list, it gets the value <ANY>. Also note that the 'quantity' parameter did not appear in the URL variant.

In another embodiment, the properties of a request and reply, used by exit control engine, are not learned for each URL but for subsets of the requests for each URL. The URL is divided to resources, and properties of the reply are learned for each resource. Each resource is defined by a key, which consists of a URL and the parameters and values of this URL. The process includes the following steps:

a. Collect data about the requests and replies.
b. Go over all parameters of the URL. For each parameter decide whether it has a limited (small) number of options. If so, keep the options and give them ID numbers. Otherwise do not keep the options. This is actually done on the fly, during the data collection.
c. Go over all requests and replies, and calculate the key of each one. The key is a vector that depends on the parameters and their values. The order of the parameters in the key is the same, even if different requests arrive with a different order. The key calculation is done as follows, for each parameter of the URL:
d. If it does not appear, write 0.
e. If it appears but the parameter has a large number of options, write 1.
f. If it appears and has a defined range of options, write the ID of the option that arrived.

g. Group together the parameters that have the same key (i.e. same URL, same parameters and same parameters' values). For each group, learn the following properties of the reply:
Size.
Title.
Patterns (mandatory, forbidden and special).
Number of images.
Number of links.
Number of forms.
Hash
Content type When validating a reply, a key is calculated and its properties (size, title, etc) are matched with the properties learned from the other requests with the same key. For example, assume the URL /catshop.cgi can receive the following parameters:

"product": can be one of the following strings: "catnip", "lasagna", "wool", "mouse".
"credit card": can be any credit-card number.
"quantity": can be "1", "2" or "3".
"notify": can appear several times, with the following strings: "email", "snailmail", "sms", "singing_clown".

Then the parameters are analyzed:
"product": Each string gets an ID: "catnip"=1, "lasagna"=2, "wool"=3, "mouse"=4.
"credit card": Recognized as a parameter with many changing values.
"quantity": Each value gets an ID: "1"=1, "2"=2, "3"=3.
"notify":

Because a parameter can appear several times there are a very large number of combinations. If only a small subset of the options actually appears, they may be listed and given ids. For example, the combination "email", "snailmail" gets the ID 1, and the combination "snailmail", "singing_clown" gets the ID 2.

Then keys are calculated for specific requests. The keys may be vectors that include a value for each parameter, in the same order as above. For example the request "/catshop.cgi?product=mouse&credit_card=1234567890& quantity=2" gets the key: 4, 1, 2, 0. And, the request "/catshop.cgi?product=catnip&notify=snailmail&notify= singing_clown" gets the key: 1, 0, 0, 2. After possible keys have been detected. The data about the replies are learned.

Learning Parameter Values

There are several techniques for learning a list of values for a given parameter. For example, parameter values may be learned "on the fly" during the learning period, in order to avoid saving the values of all requests to the database when there are many parameter values possible. The output of the learning process may be used both for exit control and for entry control.

In one example, a table with a desired number of rows and columns may be kept for every parameter. In one example, the table may have many rows and three columns, the columns can be labeled "value", "appearances" and "initial." The value column keeps strings (the value of a parameter), the appearances column keeps the number of appearances of this value, and the initial column keeps the date when the value first arrived. The table may initialized with empty rows.

Whenever a value arrives for a parameter, it can be searched for in the table. If there is an entry for the parameter already in the table, the "appearances" column for the parameter is incremented by 1. When a value that is not in the table arrives, it is added to the table. If the table is full then the parameter may be added to the table by replacing the table entry with the lowest number of appearances (if several entries have the same number of appearances, the entry that is replaced can be the one with the lowest "initial" value).

In one example there may be values that are longer than 40 characters. Generally, such values are unlikely to be parts of static lists, so it is not necessary to extend memory saving them. These values typically are dropped and not inserted to the table. When they arrive, only the total number of requests for the parameter is increased.

When the learning period is over, the resulting table may be used both for exit and for entry control. The final table can include the same columns as before, and may also include additional columns. For example, an additional column "probability", can be added which defines the percentage of times out of the total number of requests that the value appeared. The probability can be calculated by dividing the "appearances" column by the total number of requests.

During the learning process, it can be decided whether a parameter can be validated using an entry-control list. First a property reference (Property ref) value can be calculated for the values of the parameter in the table. Next, all the values in the table are checked and values that have a percentage that is smaller than the value of "property ref" are removed from the table. Then, the percentage of appearances of values that are not in the table is calculated (1 minus the sum of the percents of all values in the table). If this percent is higher than "property ref", the parameter isn't learned as a list. Otherwise, the resulting table is kept and used for request validation. Values that do not appear in the table trigger an alert.

Even if the table was learned as a list, it might still be useful to divide replies to URL variants according to the different values of this list. This can be useful when the list is very long, for example, more than a length of 30. One technique that can be used to verify if a list can be used for ExitControl, is to sum the "probability" values of the 10 values with the highest probability. If the sum is more than 0.8 (80% of the requests used one of these 10 values), them the corresponding rows may be selected as the list of values for the parameter. In this case, if more than 10 values appear, the rest of the values can be combined as one option ("other"). If the sum of the probabilities was lower than 0.8, it may be decided that the parameter can accept too many changing values and the list is not used for exit-control.

Distributed Detect Prevent Architecture Module (DDPA)

The Web application security system can also include a distributed detect prevent architecture module (DDPA) 316 for distributed threat management. The DDPA module 318 can allow organizations to manage application security in the same way they presently manage the applications themselves. Because the Web application protection module 128, shown in FIG. 1, is not in-line, it does not interfere with production network traffic to protect the application or to institute alerting or blocking actions. But, the web application protection module 128 can coordinate with the DDPA 316 allowing organizations to choose a blocking point, and use network-level devices to intercept potential threats. For example, the DDPA 316 can use firewall blocking, TCP resets to the Web server, and SNMP to alert a network monitoring device.

As an out-of-line appliance, the Web application protection module 128 is architected to allow for detection of threats within the context of the application, unlike devices designed to be in-line that focus on the network packet level. The Web application protection module 128 can detect potential threats and then work with the appropriate network-level device, such as a firewall to block malicious behavior. Because of its flexibility and ease of management, the Web application protection module 128 provides centralized application monitoring with distributed threat protection.

The Web application protection module 128 provides protection of many threats, including, but not limited to the following list:

- SQL Injection
- Cross-site Scripting
- Known and Unknown Application-Level attacks
- Zero Day Attacks
- Session Hijacking
- Cookie Tampering
- Protocol Manipulation
- Automated Worms
- Attack Reconnaissance
- Data Leakage & Identity Theft
- XML Parameter Tampering and Data Theft
- OWASP Top 10 Security Threats Example Embodiments To illustrate how aspects of the Web application protection system operate, following are descriptions of an example of prevention of an SQL injection and a Session Hijacking, two of the most common and dangerous Web application targeted attacks.

Preventing a SQL Injection Attack

An SQL Injection is an attack method used to extract information from databases connected to Web applications. The SQL Injection technique exploits a common coding technique of gathering input from a user and using that information in a SQL query to a database. Examples of using this technique include validating a user's login information, looking up account information based on an account number, and manipulating checkout procedures in shopping cart applications. In each of these instances the Web application takes user input, such as login and password or account ID, and uses it to build a SQL query to the database to extract information.

With user credential validation or account lookup operations, one row of data is expected back from the database by the Web application. The application may behave in an unexpected manner if more than one row is returned from the database since this is not how the application was designed to operate. A challenge for a cyber-criminal, or hacker, wanting to inappropriately access the database, is to get the Web application to behave in an unexpected manner and therefore divulge unintended database contents. SQL Injections are an excellent method of accomplishing this.

SQL queries are a mixture of data and commands with special characters between the commands. SQL Injection attacks take advantage of this combination of data and commands to fool an application into accepting a string from the user that includes data and commands. Unfortunately, a majority of application developers simply assume that a user's input will contain only data as query input. However, this assumption can be exploited by manipulating the query input, such as by supplying dummy data followed by a delineator and custom malicious commands. This type of input may be interpreted by the Web application as a SQL query and the embedded commands may be executed against the database. The injected commands often direct the database to expose private or confidential information. For example, the injected commands may direct the database to show all the records in a table, where the table may contain credit card numbers or account information.

A technique to protect Web applications from SQL Injection attacks is to perform validation on all user input to the application. For example, each input field or query parameter within the application may be identified, typed and specified in the security profile during the Adaption process. While validating traffic against an application's security profile, user input can be checked to ensure that it is the correct data type, it is the appropriate data length, and it does not include any special characters or SQL commands. This technique prevents SQL Injection attacks against a Web application by ensuring that user input is only data with no attempts to circumvent an application's normal behavior.

Figure 7:
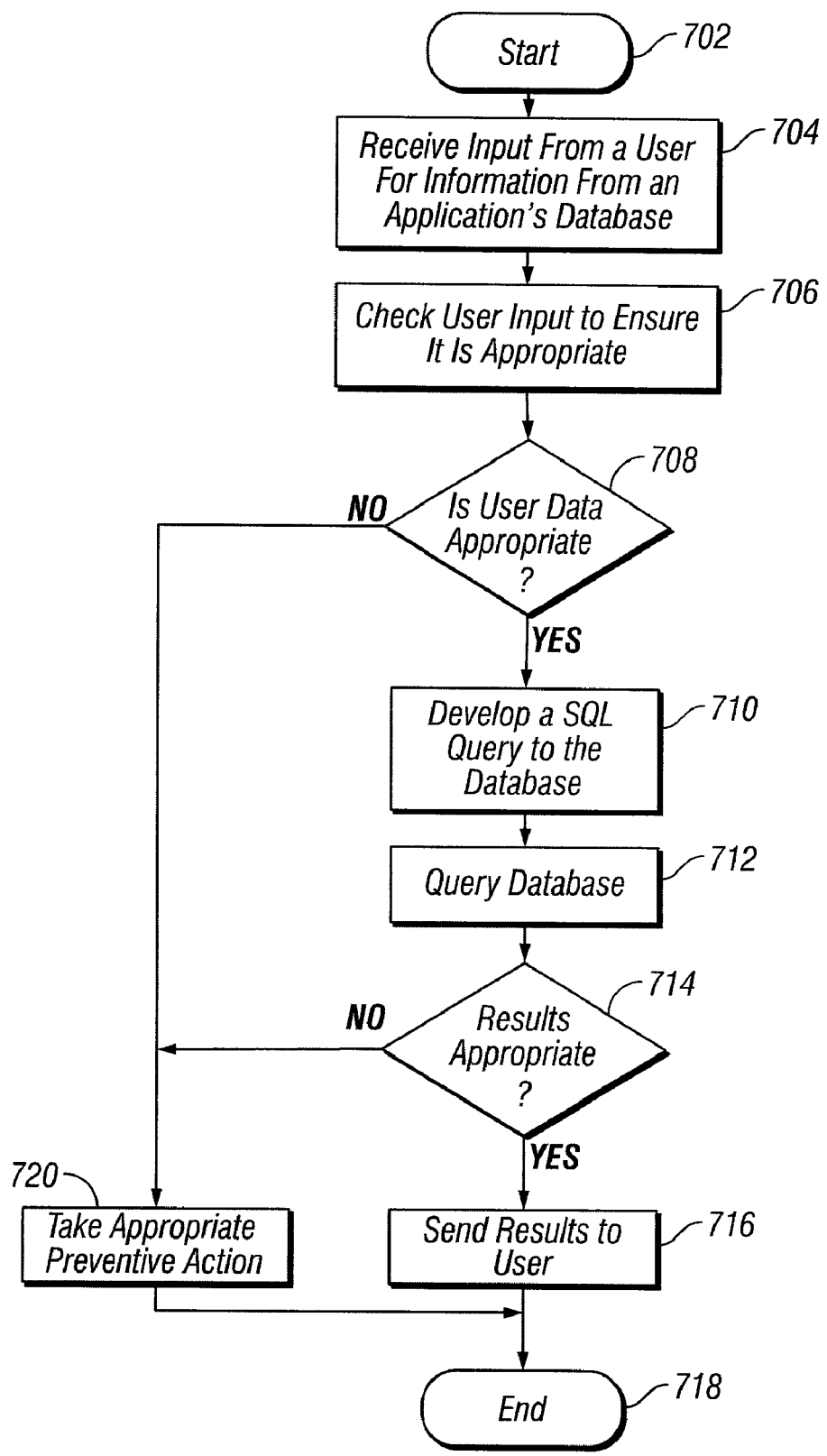
FIG. 7 is a flow chart illustrating an example technique for preventing a SQL Injection attack.

FIG. 7 is a flow chart illustrating an example technique for preventing a SQL Injection attack. Flow begins in block 702. Flow continues to block 704 where input from a user requesting information from an application's database is received. An example of a user requesting information from a database is a shopper requesting the price or availability of an item at a shopping web site. Flow continues to block 706 where the user input is checked to ensure that it is an appropriate. For example, each input field is checked to ensure that it is the correct data type, it is the appropriate data length, and it does not include any special characters or SQL commands.

Flow continues to block 708 where it is determined if the user data is appropriate. If the user data is appropriate, a positive outcome, then flow continues to block 710. In block 710 a SQL query to the database using the user input is developed. Flow continues to block 712 where the database is queried. Then in block 714 it is determined if the results returned from the query are appropriate. If the results are appropriate, a positive outcome, then flow continues to block 716 and the query results are sent to the user. Flow continues to block 718 and ends.

Returning to block 714, if the query results are not appropriate, a negative outcome, then flow continues to block 720. Now, returning to block 708, if it is determined that the user data is not appropriate, a negative outcome, flow continues to block 720. In block 720 appropriate preventive actions is taken to protect the integrity of the application. For example, the user request can be blocked, or the query results blocked from being sent to the user. A notification can also be logged to indicate that the user attempted to inappropriately access the database, or that what appeared to be a valid user input returned unexpected results from the data base. The notifications can be used to alert a network administrator about questionable behavior by a user. The notifications can also be used in the adaption of the applications profile, as well as updating threat detection engines. For example, a signature analysis engine may be updated to reflect a new attack pattern that the application is vulnerable to. After the appropriate preventive action has been taken, flow continues to block 718 and ends.

Preventing Session Hijacking

Session Hijacking is a method of attacking Web applications where a cyber-criminal or hacker tries to impersonate a valid user to access private information or functionality. The HTTP communication protocol was not designed to provide support for session management functionality with a browser client. Session management is used to track users and their state within Web communications. Web applications must implement their own method of tracking a user's session within the application from one request to the next. The most common method of managing user sessions is to implement session identifiers that can be passed back and forth between the client and the application to identify a user.

While session identifiers solve the problem of session management, if they are not implemented correctly an application will be vulnerable to session hijacking attacks. Hackers will first identify how session identifiers have been implemented within an application and then study them looking for a pattern to define how the session identifiers are assigned. If a pattern can be discerned for predicting session identifiers, the hacker will simply modify session identifiers and impersonate another user.

As an example of this type of attack consider the following scenario. A hacker browses to the Acme Web application which is an online store, and notices that the application sets a cookie when accessing the site and the cookie has a session identifier stored in it. The hacker repeatedly logs into the site as new users, getting new session identifiers until they notice that the ID's are integers and are being assigned sequentially. The hacker logs into the site again and when the cookie is received from the Acme site, they modify the session identifier by decreasing the number by one and clicking on the account button on the site. The hacker receives the reply from the application and notices that they are now logged in as someone else, and have access to all of that person's personal information, including credit card numbers and home address.

To protect against session hijacking attacks, all user sessions may be independently tracked as they are assigned and used. The Adaption process, as performed in block 350 of FIG. 3, can automatically identify methods of implementing session management in Web applications. It is then possible to detect when any user changes to another user's session and can immediately block further communication with the malicious user. For example, once the Session identifiers are learned, the session engine can maintain a state tree of all user sessions correlating the web application session identifiers with TCP/IP session identifiers and can identify when a session attempts to hijack another.

FIG. 8 is a block diagram of an example computer network illustrating aspects of preventing Web application attacks. The aspects described in relation to FIG. 8 can be used individually, or in combination with the aspects and features described above. Similarly to FIG. 1, FIG. 8 shows a user 102 is in communication with a wide area network 104, such as the Internet. Also in communication with the wide area network 104 is a computer network 802. In one embodiment, the computer network 802 includes a security portion 804, a networking portion 806 and an enterprise portion 808.

Similarly to the DMZ 108 of FIG. 1, the security portion 804 of the computer network 802 includes a firewall 810, an authentication module 812, and an intrusion prevention system (IPS) 814, and the networking portion 806 of the computer network 802 includes a router 816, a load balancer 818, and web servers 820. Also included in the networking portion 806 of the computer network 802 is a security module 822. The enterprise portion 808 of the computer network 802, similarly to the infrastructure network 110 of FIG. 1, includes a firewall 824, an enterprise content delivery server 826, a backup server 828, and a scanner 830.

The security module 822, similarly to the web application protection module 128 of FIG. 1, monitors network traffic to identify anomalous traffic, or behavior, and can coordinate detection and protection mechanisms of other devices within the computer network 802. In other words, the security module 822 can exchange information and instructions with other network components to detect and prevent network attacks. The security module 822 can provide a sliding scale of responsive actions from monitor-only, through TCP-resets, load-balancer session-blocking, firewall IP blocking, logging out users, and full blocking with a web server agent. The security module can also include an alerting mechanism for providing event information to network and security management systems through SNMP and syslog as well as email and console alerts. The security module provides a flexible architecture for generating response to threats and acts as a centralized point of application security intelligence with distributed points of control. The security module 822 architecture allows organizations to leverage their existing network devices to prevent attacks without having to install yet another inline device.

For example, in a typical operation, traffic from a user 102 is received at the computer network 802 via the wide area network 104. The traffic passes through the firewall 810 where the traffic can be monitored. If the security module 822 identifies the traffic as being anomalous, or suspicious, then the firewall can be directed to block the traffic to prevent it from entering the network. In addition, information about the traffic can be recorded, such as identifying that an event has occurred. Traffic that passes through the firewall 810 is then communicated to the authentication module 812. In the authentication module 812 sessions and users can be identified. In response to the authentication process, the security module 822 can initiate various prevention techniques may be implemented. For example, if a user has previously been identified as a potential attacker, then the authentication module 812 may block that user from entering the network when their identity is discovered through the authentication process.

After authentication, traffic flows to the IPS 814. The IPS 814 can collect event information for correlation by the security module 822. If the security module 822 correlation of events reveals that there is a possible attack, then the security module 822 can direct the IPS 814 to block the traffic, or direct the IPS 814 to log, or report, the event. Traffic then flows to the routed 816. If the security module 822 determines that there is a possible attack, the router 816 can be directed to block the traffic, or to redirect the traffic to a desired destination. Traffic that is passed by the routed 816 is then communicated to the load balancer 818. In the load balancer, the session can be identified as well as identifying site or configuration information. The security module 822 can analysis the information collected by the load balancer 818 to determine if preventive action needs to be taken. The security module 822 can direct the load balancer 818 to block the traffic, as well as to remove a broken application from a Web farm.

As the user 102 interacts with the web servers 820, the security module 822 monitors the users' activity and behavior to assess a Web application's vulnerability and risk level. If the security module 822 determines that risk level of the servers exceeds an acceptable level the security module 822 can direct the servers to block the traffic. The security module can coordinate with the enterprise content server 830 and monitor and detect if there has been a change in the Web application. If there has been a change detected, the security module 822 can direct the enterprise content delivery server 830 to deliver a cached page.

The security module 822 can also coordinate with the backup server 828 to detect changes in the Web application as well as monitoring the applications profile. If it is determined that there has been a change to the application, the backup server 828 can reload the current page to the web server 820. The scanner 826 can provide the security module 822 with information about the application profile and information about the application vulnerability for event prioritization. The security module 822 can coordinate with the scanner 826 to maintain an accurate application profile.

As described above, the security module is a non-intrusive web application firewall providing fully automated application profiling with comprehensive protection against all web application attack techniques. The security module prevents web attacks through its distributed detect/prevent architecture which provides integration with existing network devices and their respective preventative capabilities. This architecture allows organizations to leverage their existing network devices to prevent attacks without having to install yet another inline device.

Many customers are not comfortable enough, at first, with application security to hazard blocking a legitimate business transaction and as a result these customers are suffering from the increased latency and downtime risk of an inline device without using the functionality that required it being placed inline in the first place. The security module 822 provides organizations with a ratcheting scale of prevention actions from monitor-only, to TCP-resets and application logout, and full blocking prevention with a web server agent. In addition, responses are configured at an event-level providing a flexible prevention model that organizations can tune to their specific environment.

FIG. 9 is a block diagram of another embodiment of a portion of an example computer network illustrating aspects of preventing Web application attacks. The aspects described in relation to FIG. 9 can be used individually, or in combination with the aspects and features described above. As shown in FIG. 9, web traffic may be routed to and from a web server 904. The web traffic 902 is also monitored and evaluated by a security module 906, similarly to the web application protection module 128 of FIG. 1. As shown in FIG. 9, the security module 906 is a non-inline device. Because it is non-inline, the security module 906 does not introduce any latency into the traffic flow and is also not a single point of failure in the system requiring redundant deployments. An agent 908 is included in the web server 904 such that traffic is routed through the agent 908. The agent 908 can also be included in a standalone device 910. The security module 906 is also in communication with the agent 908

Returning to FIG. 8, the agent 908 can be included in an in-line standalone device (not shown) or in one of the other network components. For example, the agent 908 can be included in the firewall 816, the load balancer 816, the Web server 820, or any other network component. The agent 908 could also be located in any component in the DMZ 804.

The embodiment illustrated in FIG. 9 supports organizations which require that all attacks need to be blocked from ever reaching the server. The agent 908 provides full blocking for all incoming attacks without the need for an inline sensor.

In one embodiment, the agent 908 receives information about the application profile, and patterns of acceptable traffic behavior, from the security module 906. The agent 908 acts as a gatekeeper, holding up suspicious traffic that does not match the pattern of acceptable traffic behavior until the suspicious traffic has been analyzed by the security module 906. Using the agent 908, malicious traffic can dropped before it can reach the application.

The security module 906 and agent 908 can provide preventative mechanisms that support the ability to log malicious users out of the web application and full blocking. For applications requiring users to log in, the logout response action provides a mechanism for preventing malicious users from attacking a web application. The user's sessions may be closed down in the web application and the user can be blocked from logging in again.

The security module 906 may also include the ability to alert via email and syslog in addition to the existing SNMP alert mechanism. The alerts can also be configured by individual events or at a specific risk-level.

The aspect of being able to block malicious traffic and log out malicious users may be performed independently, or in combination. For example, the agent 908 may be configured to initially only block malicious traffic. Then, if the malicious traffic continues the agent 908 may log the user out. Also, depending on the type of malicious traffic, the agent 908 may be configured to immediately log the user out. For example, if the malicious traffic matches a known attack signature the agent may be configured to immediately log out the user.

The use of an agent 908 provides some advantages over other prevention techniques. For example, a firewall configured to block malicious traffic may inadvertently block legitimate traffic. In addition, using a TCP reset is usually slow, so that malicious traffic may get through before the reset.

As noted, in one exemplary embodiment, the agent may be included in a firewall. The agent can cooperate with the security module to provide desired protection. This embodiment offers several advantages, including:

- The security module implementation is indifferent to the firewall that is being used and can operate with man different types of firewalls.
- An existing open source agent can be used, such as an open source plug in agent "Snort" or "ModSecurity™" that can be integrated with a firewall.
- White-list support of IP addresses and Subnets addresses that should never be blocked.
- Subnet blocking-according to default configuration and not IP class.
- Blocking duration limitation.
- OPSEC support using the Check-Point SDK.
- GUI support for agents' configuration.

In one embodiment, the following data can be sent from the security module to the agent when there is a request:

- Source (Client) IP and port.
- Destination (Web Server) IP and port.
- Blocking duration.
- Packet protocol (TCP/UDP).
- Mode:
- IP address to be blocked (source, destination).
- Packets to be blocked including packets IN coming from host, OUT going to host, EITHER way, or only THIS connection (IP/service pair)
- One of the allowed actions (check-in, check-out, block, unblock).

A watch-dog mechanism may be included to ensure that the security module has a connection with the agent. For example if the agent is inoperative, or "down", a relevant message can be generated, and no blocking will occur. Events generated by the watch-dog are typically "system" events in order for them to be noticed by the user. In addition an agent log can include an agent configuration file to be placed in the security module logs directory. Typically, the log file is not cyclic therefore it may need maintenance if it gets to large.

Following is a summary of exemplary configuration options in the agent configuration file.

- defaultkey <key>—Set's the default key (used for data encryption/decryption between security module and agent) for allowed hosts to <key>. The default key is used when no other key is specified in an ACCEPT option.
- port <port>—This sets the listening port to <port> (defaults=898).
- accept <host>/<mask><key>—Lists the security module sensor that the agent is accepting plackets from. It can specify the hostname, IP address, IP address and network mask, and optionally an encryption key used configured for that host or network.

dontblock <host>/<mask>—This adds the host or network to the white-list of hosts/networks that will not be blocked. Blocking requests for hosts on this list are ignored.

override <host>/<mask>,<time>—Each blocking request has its own time interval for the blocking request.

keyinterval <time>—This causes the agent to request/create a new encryption key every <time> (defaults=4 hours).

rollbackhosts <amount>—This tells the agent to keep a record of <amount> last blocks for each security module. These blocks will be rolled back, meaning the hosts unblocked, in the event that the blocking threshold is exceeded. If omitted, the agent will not keep a record of the IP addresses that have been blocked for rollback purposes (default=0).

rollbackthreshold <amount>/<time>—This specifies the blocking threshold. If the threshold is exceeded (more than <amount> blocking requests in <time>), the agent will unblock the last <x> hosts specified by the ROLLBACKHOSTS statement (default=1000/0).

rollbacksleeptime <time>—When the rollback threshold has been exceeded, the agent will ignore blocking requests until the level drops back below the threshold. Using this option an additional time period can be specified that the agent will wait until it starts acting on blocking requests again (defaults=15 minutes).

skipinterval <time>—The agent skips repetitive, identical blocking requests (for performance reasons). Here you specify the time interval for which blocks are considered repetitive (default=10 seconds).

skiphosts <amount>—Tells the agent how many hosts it should remember for repetitive block checks (default=10).

logfile <filename>—The agent will use this file to log certain events such as program start, block/unblock actions performed and error events. If only a file name is specified (without a path), the file will be created:

loglevel <level>—The logging level can be set to the type of logging. For example the logging level can be set to four levels, 0, 1, 2, or 3 where 0 indicates "Quite" where no logging occurs, 1 indicates "Sparse" and only errors are logged, 2 indicates "Normal" and errors and blocks are logged, and 3 indicates "Verbose" and additional information (such as connections/disconnections) are logged as well.

The agent configuration can also include flags. Following is a list of examples flags:

avoidstatefile—The agent may keep a state file so the additions to a don't block list can be checked against current blocks (and unblocked automatically if a host is on the DONTBLOCK list, but had been blocked before). If the agent is used only to block on Checkpoint firewalls, it could avoid the stat file since FW-1 will time-out blocks by itself. To do that, just use this statement in the config file.

disableseqnocheck—This turns off sequence number checking in the agent.

fwsamipflip—The block method should block the correct IP address if the agent is run on the firewall host itself. However, if the agent runs on a small-endian box, and FW-1 runs on a big-endian box, it may block the reversed IP address. Use this option to flip it back to normal.

nothreads—This disables the multi-threading capability and causes the agent not to use thread functions at all. Instead, all plug-in are executed sequentially within the main process.

daemon—This causes the agent to turn into a daemon upon startup. It is similar to the –D option on many other tools and services.

Reverse-Proxy Server

In one embodiment, a Web application protection module, like the protection module 128 of FIG. 1, can be configured as a reverse-proxy server. A reverse-proxy server is a server, typically deployed in front of web server(s) that receives all incoming requests for the web server(s). The reverse-proxy server can perform some operations on the incoming request, such as analyze it for attacks, decrypt the SSL, provide load distribution for a farm of web servers handling the same site, or cache static content.

In one embodiment, all requests for a particular web site are translated to a particular IP address, for example, 168.192.0.1 by DNS. When an inbound request for that address is received by an organization's network it is routed to the reverse-proxy server (i.e. the reverse-proxy server has the IP address 168.192.0.1). The reverse-proxy server then performs the desired operations on the request, and then properly routes the request to the appropriate web server. Operations performed by the reverse-proxy server can include, for example, signature-based analysis of web traffic, inline blocking of malicious traffic, develop application profiles, perform behavioral analysis, and other security features.

Advanced Usage Analysis

As described above, usage analysis is a technique that for analyzing groups of events looking for a pattern that may indicate that the computer network is being attacked. In advanced usage analysis this technique is expanded, so instead of analyzing individual events, or groups of events, the overall usage of an application is examined for patterns of potential attack. For example, historical event can be analyzed, along with current events, to determine if there is a pattern of suspicious behavior. In this way, events associated with users that are identified as using the application in an unusual manner can be used to predict possible future attacks by other users.

Forensic and Detect/Record

When suspicious activity is detected in a computer network the suspicious user's activity may be recorder. The recording can be encrypted, or otherwise controlled, and a chain of custody maintained. The recording can then be played back later to reveal the actual activity of the user. The forensic and detect/record capability can be a deterrent to user's malicious behavior because it provides accountability to the user for their activity. For example, the forensic recording could be used by law enforcement officials to prove that a user was attacking a network.

Denial of Service Prevention

A denial of service attack can occur if a user makes many request is a short period of time and thereby overwhelm a network's resources. To prevent this type of attack, a network security module can monitor network traffic and determine if the same user is making multiple request during a short period of time, and if so the security module can take appropriate actions. For example, the user could be logged out. The user could also be denied future access to the network.

Brute Force Login Prevention

An unauthorized user may attempt to login to a network. For example, the unauthorized user may be attempting to login as a different user. In these situations, the user may fail the login procedure, for example, the unauthorized user may enter an incorrect password. Typically, the unauthorized user will continue attempting to login to the network using different passwords, in the hope that they will eventually enter the correct password. To prevent this "brute force" login by an unauthorized user, a security module in the network can monitor the number of times a specific user attempts to login. If the specific user fails to correctly login, then after a predetermined number of attempts, the user is denied access, and not permitted to continue attempting to login.

Securing Web Applications Across an Enterprise

Figure 10:
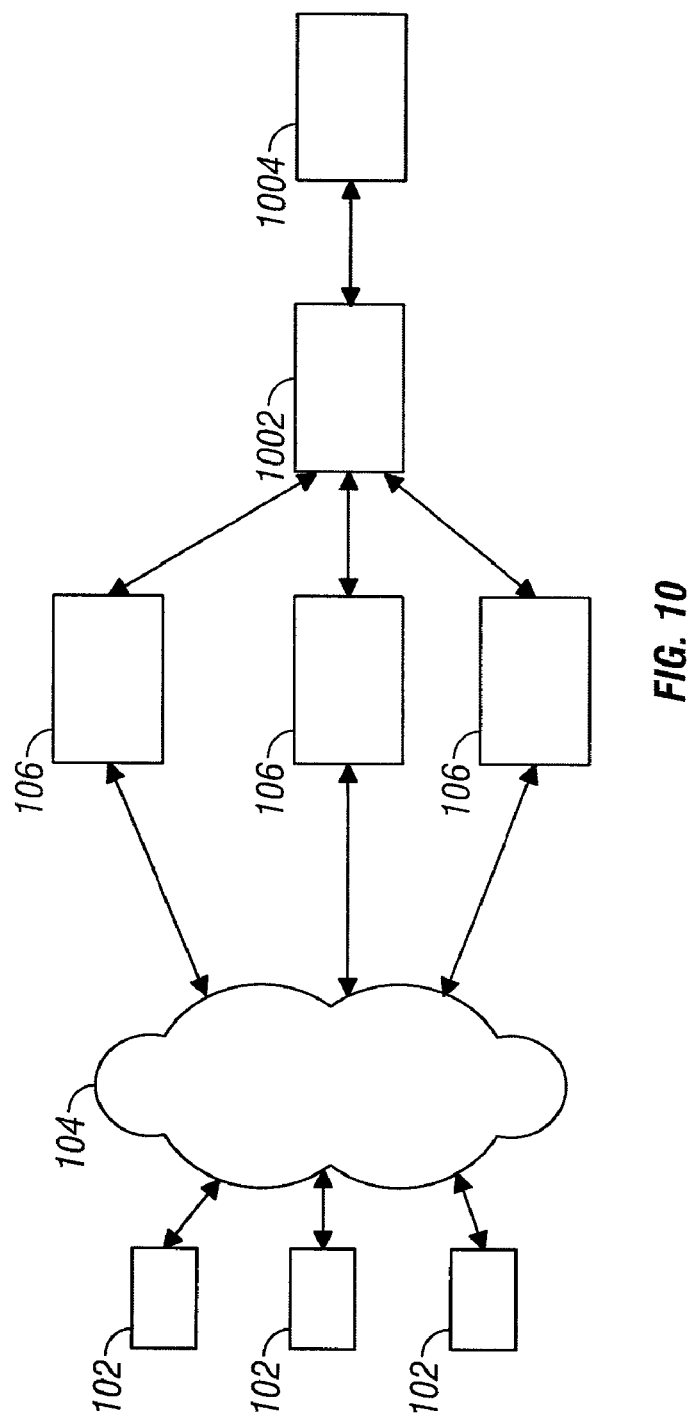
FIG. 10 is a block diagram illustrating an example enterprise.

The techniques described above can be applied, either individually or in combination, across a portion of an enterprise, an entire enterprise, or across several enterprises. An enterprise includes one or more networks under control of a single entity, FIG. 10 is a block diagram illustrating an example enterprise. As shown in FIG. 10, users 102 may be in communication with computer networks 106 over a wide area network 104. The computer networks 106 can each include a protection, or security, module, as described above. In one example, the computer networks 106 may be part of the same enterprise. For example, the computer networks may support various operations within an enterprise, such as, accounting, information technology, sales, etc. In another example, the computer networks may be different, or parts of different, enterprises. For example, the computer networks may be in enterprises that are all in an associated field, for example, all of the enterprises may be financial enterprises.

The computer networks 106 are also in communication with a centralized security manager module 1002. The security manager module 1002 can monitor and coordinate security activities between the security modules within the computer networks 106. The security manager module 1002 can also be in communication with a centralized database 1004.

The security module in the computer networks can communicate information about events that occur within their respective networks to the security manager module 1002. Returning to FIG. 3, the advanced correlation engine module 310 can be adapted to report events to the security manager module 1002. Likewise, the collaborative detection module 308 may be adapted to report events to the security manager module. Event reporting can be periodically driven, request driven, or event driven. In addition, event reporting may be based upon "push" techniques, or "pull" techniques, or both.

The security manager module 1002 can analyze events within the separate computer networks 106 to identify, and respond to, attacks across multiple computer networks 106. For example, the computer networks 106 may each be providing a different application to users of the enterprise, and cybercriminals may be attacking, or probing, the enterprise across multiple applications. The security manager module 1002 can monitor events at each of the individual computer networks 106 to identify an attack across the entire enterprise. For example, events within a single computer network 106 may not be severe enough to indicate an attack, but events, even if low level at individual computer networks 106, may indicate an attack when aggregated across the entire enterprise.

In another example, the computer networks 106 may be in different enterprises, and the security manager module 1002 may monitor for attacks across multiple enterprises, such as, enterprises across an industry segment. For example, a group of enterprises within a common industry segment, such as financial enterprises, may agree to send security events within their computer networks to a central security manager. The central security manager may then aggregate the events to identify if there is an attack against the industry segment and notify the enterprises so that they may take appropriate action, or the centralized security manager may coordinate the security actions across the enterprises.

The centralized database 1004 can be used to update the security modules within the computer networks 106. For example, configuration files for security modules within the computer networks can be maintained in the centralized database. When there are updates, such as revised security policies, or reporting policies, or others, the updates can be made to the centralized database 1004 and then distributed to the security modules in the computer networks 106. Using the centralized database 1004 allows an enterprise to have a single point for updating and maintaining security policies and procedures across an entire enterprise. Likewise, a centralized database could be used as a single point for updating and maintaining security policies and procedures across multiple enterprises The example illustrated in FIG. 10 is an embodiment with a security management module 1002 and multiple security modules, or sensors, in individual networks 106 to protect multiple Web Servers. In this example, the sensors can function independently from each other. That means that each sensor can validate data that enters the network 106 and the data that leaves the network 106, learn profiles, generates profiles, issue events, perform blocking actions according to a prevention configuration, etc. The management module 1002 can be installed on one of the sensors, or on an independent machine. The management module 1002 is responsible of managing an n-tier architecture. That is, the management module 1002 is responsible for all configuration and management actions done by the sensors in the networks 106. Event viewing and reporting can be done by a console communicating directly with the individual sensors or with the management module 1002, or both. As discussed, the management module 1002 introduces to the user a single point of access. All of the system configuration, such as managing sites, events viewing etc. can be through a single management module 1002.

The security system is scalable by adding or removing sensors to the system. Sensors in an enterprise system typically include an updated global configuration that is consistent across all of the sensors in the enterprise. The global configuration includes configurations that are not specific for one site or another (e.g. policies, BreachMarks etc.). In other words, there specific sensors may include, in addition to the global configurations, additional configurations that are specific for an individual sensor.

Thus, the management module 1002 can be responsible for centralizing the security system's configuration and monitoring and also for keeping the system synchronized. The management module 1002 keeps the system synchronized by acting as the entry point for management and configuration actions. It also checks each action and distributes it to the target sensor(s). In addition, an action can be handled by the management module 1002 and not be distributed to any sensors, or distributed to one sensor, or distributed to all sensors depending on the type of action. Also, distribution of action data to the sensors can be done concurrently to all sensors, or to individual sensors, or groups of sensors, at desired times.

Typically, configuration requests are synchronized in a way that the management module 1002 notifies the result of an action after all sensors have reported their respond (success or fail). Upon an error that might cause a sensor to lose synchronization of its global configuration with the management module 1002, the sensor is considered to be an unsynchronized sensor. An unsynchronized sensor may be excluded from a list of sensors handled by the management module 1002. The user can be provided with an indication that a sensor is considered as unsynchronized.

An unsynchronized sensor may still be fully operational. That means that an unsynchronized sensor can still protect the defined sites, issues events, blocks request etc. Also, the unsynchronized sensor can become synchronized again by a specific user request. In another embodiment, unsynchronized sensors can automatically re-synchronize themselves. Further, even if the management module 1002 becomes inoperative or is "down" the sensors can still be operational.

In an embodiment, two or more Web Servers that handle the same site can be protected by installing a sensor in front of a Load Balancer and defining the sites that the load balancer balances traffic for as one security site. In another embodiment, two or more Web Servers handling the same site can be protected by installing two, or more, sensors in front of each of the Web Servers.

Figure 11:
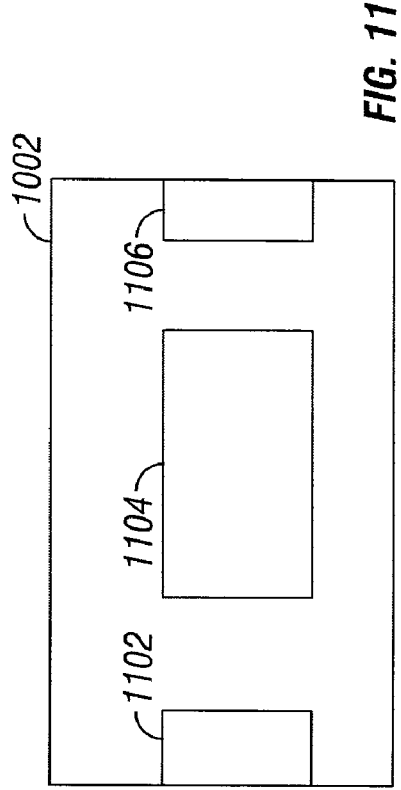
FIG. 11 is a block diagram illustrating further details of an example centralized security manager.

FIG. 11 is a block diagram illustrating further details of an example centralized security manager 1002. As shown in FIG. 11, the centralized security manager 1002 includes an input 1102, a processor 1104 and an output 1106. The input 1102 is adapted to receive information about security events from a plurality of computer networks, such as the computer networks 106 of FIG. 1. The security events at the computer networks can be identified by comparing network traffic with a profile of acceptable user behavior for interacting with an application.

The processor 1104 is adapted to analyze the information about security events to identify security threats. The processor 1104 can analyze security events from the plurality of computer networks to evaluate an entire enterprise to determine if the enterprise is the subject of an attack. In other words, low level security threats at multiple computer networks can be correlated to determine if the low level threats may be part of an enterprise wide attack. The processor 1104 can also determine an appropriate response for the individual computer networks to counter the threat. In this way the processor 1104 can coordinate an enterprise wide response to a threat. The processor 1104 communicates instructions for responding to the security threat via the output 11106.

In addition, the collaborative detection module 308 monitors outbound traffic as well as inbound traffic to prevent data leakage such as Identity Theft.

In one embodiment, the security manager 1002 is adapted to receive threat-detection results from a plurality of networks 106 and to correlate the results to determine if there is a threat pattern. The security manager 1002 is also adapted to receive security policies and to determine an appropriate response if there is a threat pattern. The security module 1002 can be adapted to analyze events generated by detection engines within the plurality of networks 106. This analysis can include positive (behavior engine/adaption) and negative security models (signature database) with other specific aspects of network events taken into account (session, protocol). As described above, the events can included behavioral events, signature events, protocol violations, session manipulation events, usage analysis, exit control events, Web services events, and others. For example, the security manager 1002 may correlate Exit Control events (outbound analysis) with inbound attacks from several networks 106 to determine that there may be an attack, and therefore escalate the severity of the alerting/response. The security manager 1002 can notify the individual networks 106 of the potential attacks and coordinate the networks response.

In one embodiment, if the security manager 1002 confirms a threat, then a desired security policy can be implemented to provide an appropriate responsive action. As noted earlier, a security policy defines a configuration of the security system's detection and prevention capabilities. A policy may be a specific implementation of a general security policy of the organization or enterprise as it relates to specific inappropriate behavior by a network user. A policy can be defined per individual network 106, or a particular application, or it can be defined for an enterprise, or across several enterprises.

The security manager 1002 can also be adapted to "learn" acceptable network, or application, behavior for users. The security manager 1002 may monitor events that are reported by the plurality of networks and adapt its analysis as acceptable user behavior changes over time. The techniques used by the security manager 1002 to learn acceptable behavior are similar to the techniques discussed above.

This application incorporates by reference, in their entirety, U.S. patent application Ser. No. 11/458,965, entitled "System and Method of Securing Web Applications Against Threats", U.S. Provisional Patent Application Ser. No. 60/807,919, entitled "System and Method of Preventing Web Applications Threats" and U.S. patent application Ser. No. 11/532,058 entitled "System and Method of Preventing Web Application Threats."

While many of the examples in the present description has described preventing Web application threats, the techniques described can be used in any network, or application, to monitor and identify anomalous traffic in a network. In other words, network traffic does not have to be intended for a Web application for the techniques described to be used. In this way all network traffic, not just application traffic, can be analyzed to determine if it is acceptable traffic. For example, traffic internal to a network, such as traffic between two network users, or a network user and a network device, or any network traffic, can be monitored to determine if the conforms to acceptable user behavior.

Those of skill in the art will appreciate that the various illustrative modules, engines, and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, engines, and method steps described in connection with the embodiments disclosed herein can be implemented or performed with a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

We claim:

1. A plurality of networks comprising:
   a security module in one or more of the plurality of networks comprising,
      a network traffic port adapted to receiving network traffic;
      a processor adapted to verify the traffic against a profile of acceptable behavior for a user of the network, identify anomalous user traffic, and to analyze the anomalous traffic by at least one threat-detection engine, wherein results from the at least one threat-detection engine are correlated to determine if there is a threat to the network;
      an output configured to communicate security events to a central security manager;
      an input configured to receive instructions from the central security manager, wherein the security module responds in accordance with the instructions;
   a centralized security manager comprising,
      an input adapted to receive security events from the security module within one of the plurality of networks;
      a processor adapted to analyze the security events from the plurality of networks to identify security threats across the networks and to determine an appropriate response to the threat by the plurality of networks based upon a security policy, wherein the analysis of the security events includes correlating information from the plurality of networks against a profile of acceptable behavior for a user of the network, wherein correlating information from the plurality of networks further comprises aggregating event information from the plurality of networks to determine whether a security threat exists, and wherein the plurality of events when viewed separately are not severe enough to indicate an attack and
      an output adapted to communicate instructions for responding to the security threat to the security module in network.

2. The plurality of networks as defined in claim 1, wherein there is a security module included in each of the plurality of networks.

3. The plurality of networks as defined in claim 1, further comprising a centralized database that includes security policy information for the plurality of computer networks.

4. The plurality of networks as defined in claim 3, wherein policy information for the plurality of networks is updated by updating the centralized database.

5. The plurality of networks as defined in claim 1, further comprising a centralized database that includes security procedure information for the plurality of computer networks.

6. The plurality of networks as defined in claim 5, wherein procedure information for the plurality of networks is updated by updating the centralized database.

7. The plurality of networks as defined in claim 1, wherein the appropriate response to the threat is coordinated across the plurality of computer networks.

8. The plurality of networks as defined in claim 1, wherein the security module monitors network traffic out-of-line.

9. The plurality of networks as defined in claim 1, wherein the security events comprise validation of parameters in network traffic.

10. The plurality of networks as defined in claim 1, further comprising at least one agent.

11. The plurality of networks as defined in claim 10, wherein the at least one agent in included within a server in at least one of the plurality of networks.

12. The plurality of networks as defined in claim 1, wherein the profile of acceptable behavior is updated by an adaptation module.

13. The plurality of networks as defined in claim 12, wherein the profile is updated automatically.

14. The plurality of networks as defined in claim 12, wherein the profile is updated in response to an application change.

15. A centralized security manager within an enterprise, the security manager comprising:
   an input adapted to receive information about security events from a plurality of networks;
   a processor adapted to analyze the information about security events from the plurality of networks to identify security threats across the enterprise and to determine an appropriate response to the threat by the plurality of networks based upon a security policy, wherein the analysis of the security events includes correlating information from the plurality of networks against a profile of acceptable behavior for a user of the network, wherein correlating information from the plurality of networks further comprises aggregating event information from the plurality of networks to determine whether a security threat exists, and wherein the plurality of events when viewed separately are not severe enough to indicate an attack; and
   an output adapted to communicate instructions for responding to the security threat to the plurality of networks.

16. The centralized security manager as defined in claim 15, further comprising a centralized database that includes security policy information for the plurality of networks.

17. The centralized security manager as defined in claim 16, wherein policy information for the plurality of networks is updated by updating the centralized database.

18. The centralized security manager as defined in claim 15, further comprising a centralized database that includes security procedure information for the plurality of networks.

19. The centralized security manager as defined in claim 18, wherein procedure information for the plurality of networks is updated by updating the centralized database.

20. The centralized security manager as defined in claim 16, wherein the appropriate response to the threat is coordinated across the plurality of networks.

21. The centralized security manager as defined in claim 16, wherein information about security events is received from security modules in the plurality of networks.

22. The centralized security manager as defined in claim 21, wherein the security modules monitor network traffic out-of-line.

23. The centralized security manager as defined in claim 16, wherein the security events comprise validation of parameters in network traffic.

24. The centralized security manager as defined in claim 16, wherein the profile of acceptable behavior is updated by an adaptation module.

25. The centralized security manager as defined in claim 23, wherein the profile is updated automatically.

26. The centralized security manager as defined in claim 23, wherein the profile is updated in response to an application change.

27. The centralized security manager as defined in claim 16, wherein the plurality of networks further comprise an agent adapted to respond to the security threat in accordance with the instructions from the security manager.

28. A method of securing networks within an enterprise, the method comprising:
    receiving information about security events from a plurality of networks within the enterprise;
    analyzing the information about security events from the plurality of networks to identify security threats across the enterprise and determining an appropriate response to the threat by the plurality of networks based upon an enterprise security policy, wherein the analysis includes correlating information from the plurality of networks against a profile of acceptable behavior for a user of the network, wherein correlating information from the plurality of networks further comprises aggregating event information from the plurality of networks to determine whether a security threat exists, and wherein the plurality of events when viewed separately are not severe enough to indicate an attack; and
    communicating instructions for responding to a security threat to the plurality of computer networks.

29. The method as defined in claim 28, further comprising storing security policy information for the plurality of networks within a centralized database.

30. The method as defined in claim 29, wherein policy information for the plurality of networks is updated by updating the centralized database.

31. The method as defined in claim 28, further comprising storing security procedure information for the plurality of networks within a centralized database.

32. The method manager as defined in claim 31, wherein policy information for the plurality of networks is updated by updating the centralized database.

33. The method as defined in claim 28, wherein determining the appropriate response to the threat is coordinated across the plurality of networks.

34. The method as defined in claim 28, wherein information about security events is received from security modules in the plurality of networks.

35. The method as defined in claim 28, wherein the security modules monitor network traffic out-of-line.

36. The method as defined in claim 28, wherein the security events comprise validation of parameters in network traffic.

37. The method as defined in claim 28, further comprising adapting the profile of acceptable user behavior as network usage changes.

38. The method as defined in claim 37, wherein the profile is updated automatically.

39. The method as defined in claim 37, wherein the profile is updated in response to a change in an application.

40. A security module within an enterprise, the security module comprising:
    a network traffic port adapted to receiving network traffic;
    a processor adapted to verify the traffic against a profile of acceptable behavior for a user of the network, identify anomalous user traffic, and to analyze the anomalous traffic by at least one threat-detection engine, wherein results from the at least one threat-detection engine are correlated to determine if there is a threat to the network, wherein correlating information from the at least one threat-detection engine further comprises aggregating event information from a plurality of networks across the enterprise to determine whether a security threat exists, and wherein the plurality of events when viewed separately are not severe enough to indicate an attack;
    an output configured to communicate security events to a central security manager; and
    an input configured to receive instructions from the central security manager, wherein the security module responds in accordance with the instructions.

41. The security module as defined in claim 40, further comprising an agent configured to block network traffic.

42. The security module as defined in claim 40, further comprising an agent configured to log out a user.

43. An enterprise wide network security system comprising:
    a plurality of networks adapted to identify security events; and
    a central security manager adapted to receive information about security events from the plurality of networks, to analyze the information about security events and identify security threats across the enterprise, to determine an appropriate response to the threat by the plurality of networks based upon an enterprise security policy, wherein the analysis includes correlating information from the plurality of networks against a profile of acceptable behavior for a user of the network, and to communicate instructions for responding to the security threat to the plurality of computer networks,
    wherein the central security manager is further adapted to aggregate security event information from the plurality of networks to determine whether a security threat exists, and wherein events within a single network are not severe enough to indicate an attack.

44. The security system as defined in claim 43, wherein the plurality of networks comprise a security module adapted to monitor traffic on the network.

45. The security system as defined in claim 44, wherein the security module monitors network traffic out-of-line.

46. The security system as defined in claim 43, further comprising an agent.

47. The security system as defined in claim 46, wherein the agent is adapted to verify network traffic against a profile of acceptable behavior for a user and to identify anomalous user traffic.

* * * * *